(12) United States Patent
Watanabe et al.

(10) Patent No.: US 8,456,715 B2
(45) Date of Patent: Jun. 4, 2013

(54) INFORMATION READING SYSTEM FOR READING INFORMATION ON DOCUMENT

(75) Inventors: Hirotaka Watanabe, Kawasaki (JP); Taketo Ochiai, Tokyo (JP); Ahimusa Uchida, Tokyo (JP)

(73) Assignee: Canon Denshi Kabushiki Kaisha, Chichibu-Shi (JP)

( * ) Notice: Subject to any disclaimer, the term of this patent is extended or adjusted under 35 U.S.C. 154(b) by 379 days.

(21) Appl. No.: 12/849,266

(22) Filed: Aug. 3, 2010

(65) Prior Publication Data

US 2011/0043870 A1 Feb. 24, 2011

(30) Foreign Application Priority Data

Aug. 19, 2009 (JP) ................... 2009-190395
Aug. 31, 2009 (JP) ................... 2009-200999
Aug. 31, 2009 (JP) ................... 2009-201002

(51) Int. Cl.
*H04N 1/04* (2006.01)
*H04N 1/40* (2006.01)

(52) U.S. Cl.
USPC .......................... 358/474; 358/448

(58) Field of Classification Search ................ None
See application file for complete search history.

(56) References Cited

U.S. PATENT DOCUMENTS

| | | | |
|---|---|---|---|
| 6,903,848 B2 * | 6/2005 | Kirita | 358/474 |
| 7,006,260 B2 * | 2/2006 | Sato et al. | 358/448 |
| 7,583,416 B2 | 9/2009 | Brugger et al. | |
| 7,800,787 B2 * | 9/2010 | Shimizu | 358/474 |
| 2004/0212849 A1 * | 10/2004 | Ikeda | 358/474 |
| 2007/0206236 A1 * | 9/2007 | Shinozaki | 358/474 |
| 2007/0211310 A1 * | 9/2007 | Kadota | 358/474 |

FOREIGN PATENT DOCUMENTS

| | | |
|---|---|---|
| JP | 2003189035 A | 7/2003 |
| JP | 2003-234864 A | 8/2003 |
| JP | 2005128878 A | 5/2005 |
| JP | 2007232988 A | 9/2007 |
| JP | 2008098994 A | 4/2008 |

OTHER PUBLICATIONS

Office Action issued in Japanese Patent Application No. 2009-0190395, dated Aug. 29, 2011.
Office Action issued in Japanese Patent Application No. 2009-201002, dated Aug. 29, 2011.

* cited by examiner

*Primary Examiner* — Twyler Haskins
*Assistant Examiner* — Henok Shiferaw
(74) *Attorney, Agent, or Firm* — Fitzpatrick, Cella, Harper & Scinto

(57) ABSTRACT

An information reading system comprising an information processing apparatus, a first information reading apparatus which is connected to the information processing apparatus and reads information on a sheet and a second information reading apparatus which is connectable to one of the information processing apparatus and the first information reading apparatus, and reads information on a sheet. The information processing apparatus comprises a control program including a first driver required to control the first information reading apparatus, and a second driver required to control the second information reading apparatus. Control information from the information processing apparatus to the second information reading apparatus is transmitted via the first driver and the second driver.

20 Claims, 19 Drawing Sheets

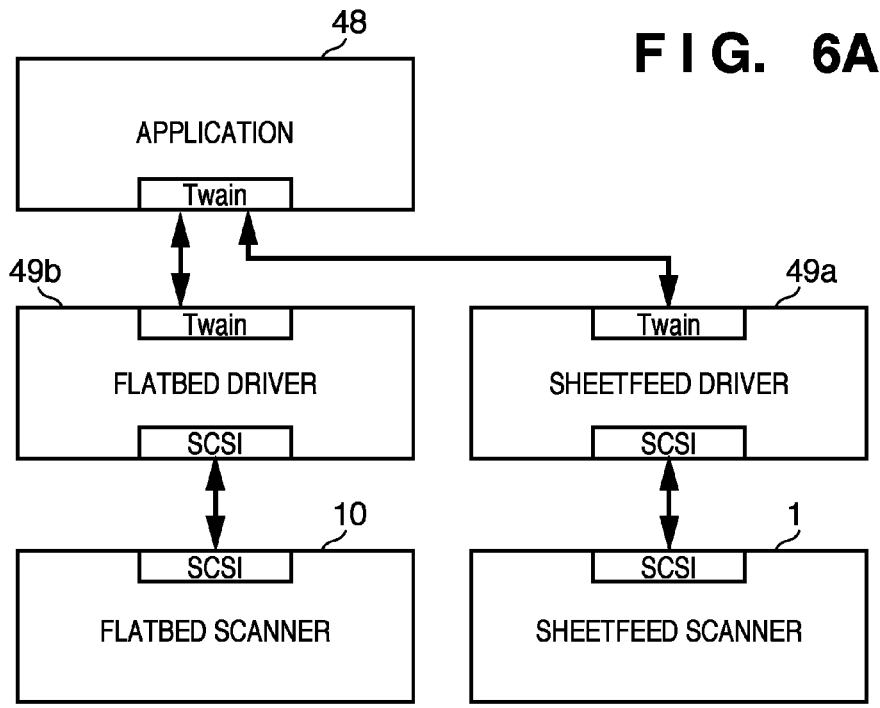
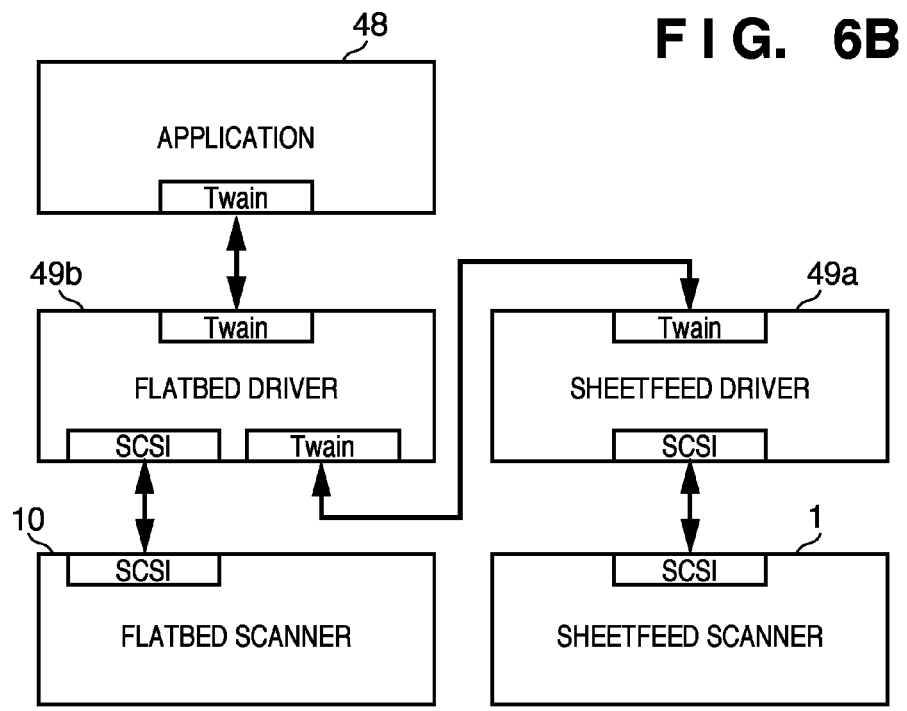

F I G. 13

| SETTING | | |
|---|---|---|
| COLOR MODE | ◉ COLOR | ～1301 |
| | ○ MONOCHROME | |
| SIZE | ◉ A4 | |
| | ○ B5 | |
| RESOLUTION | ◉ 200dpi | |
| | ○ 300dpi | |
| | ○ 1200dpi | |
| READING METHOD | ◉ FLATBED | |
| | ○ AUTO | |
| | ○ FEEDER | |

| SPECIAL FUNCTION | SCAN | Close |
|---|---|---|
| 56 | 54 | 55 |

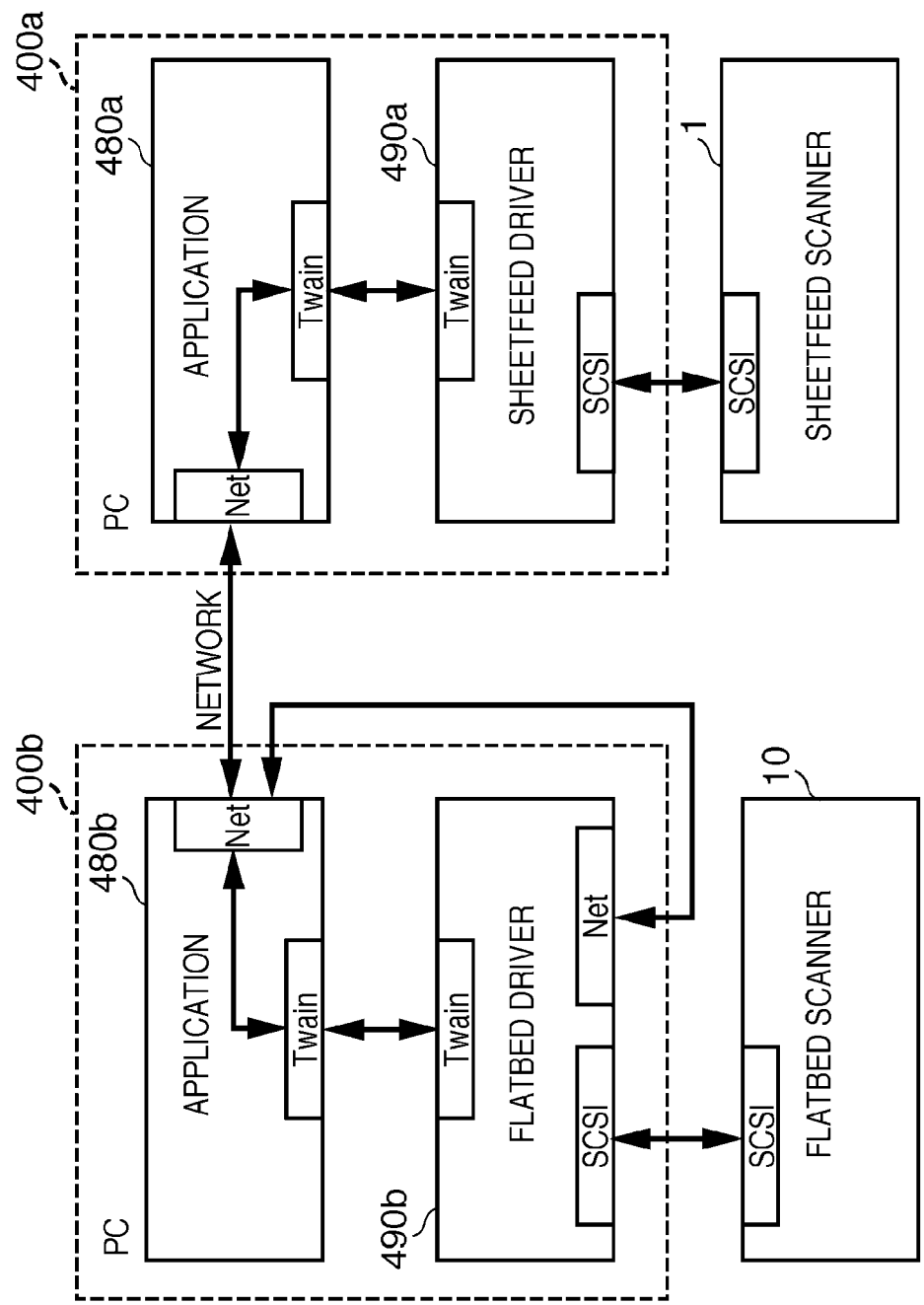

F I G. 19
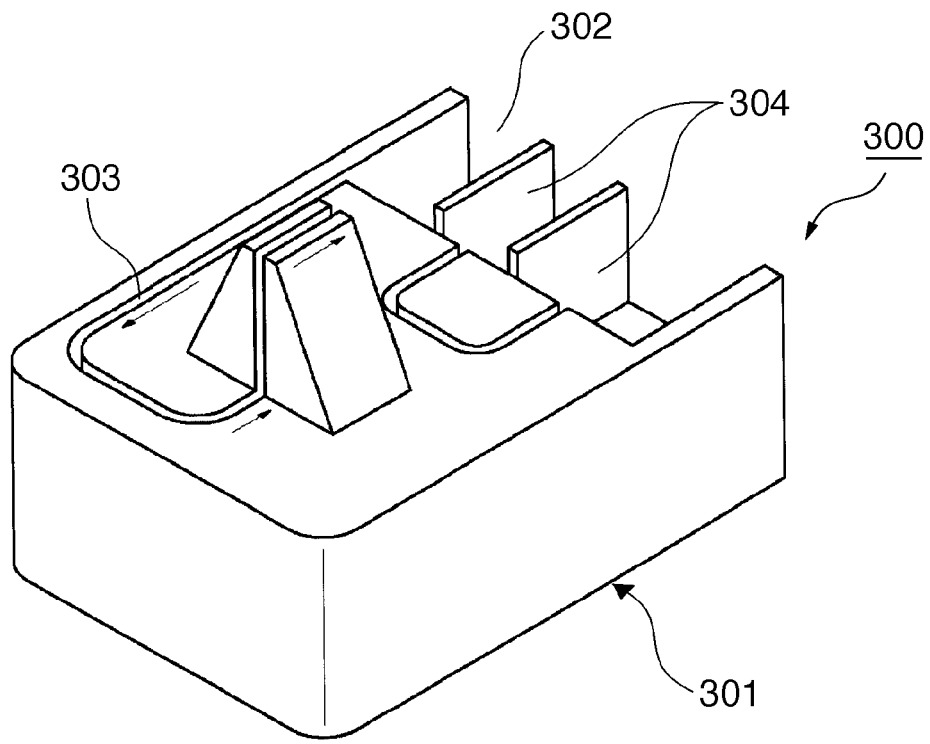
F I G. 20
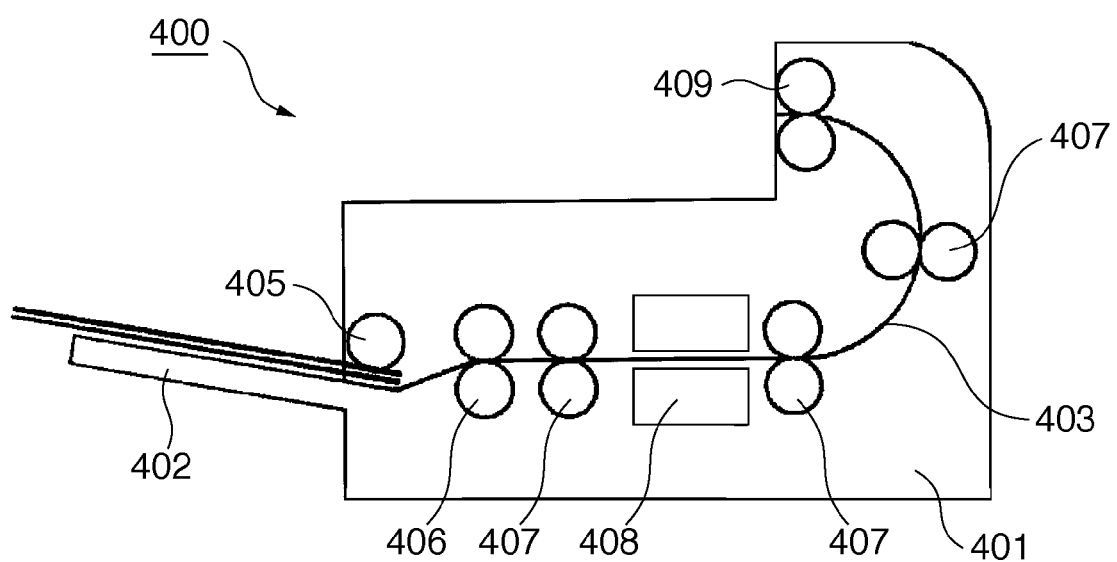

INFORMATION READING SYSTEM FOR READING INFORMATION ON DOCUMENT

BACKGROUND OF THE INVENTION

1. Field of the Invention

The present invention relates to an information reading apparatus for reading image information on a document, and a program for executing information reading processing.

2. Description of the Related Art

In general, three types of image reading apparatuses (to be referred to as a scanner hereinafter), that is, a sheetfeed scanner, a flatbed scanner, and a scanner which integrates a sheetfeed function and flatbed function (to be referred to as a combinational scanner hereinafter) are available. These scanners are selectively used as usages. For example, when documents in large quantities are to be scanned, the sheetfeed scanner is suitably used. When a book is to be scanned, the flatbed scanner is suitably used. The combinational scanner includes both these functions.

The combinational scanner can be used for various use applications since the sheetfeed and flatbed functions are integrated. However, the size of the combinational scanner is generally large, resulting in poor portability. Hence, the combinational scanner is not suitable for the user who also demands portability. The user who demands portability purchases both the flatbed scanner and sheetfeed scanner, and selectively uses them as usages. Since these scanners are relatively small, they can be removed from the desktop when they are not used.

In general, the scanner is connected to a personal computer (PC) via a connection interface such as USB (Universal Serial Bus). A program module called a scanner driver, which interfaces between an application and the scanner, controls the scanner. An image read by the scanner is passed to an application program (to be referred to as an application hereinafter) via the scanner driver, and the application displays or saves that image.

When the user purchases both the flatbed scanner and sheetfeed scanner, he or she has to respectively install a driver for the flatbed scanner (to be referred to as a flatbed driver hereinafter) and that for the sheetfeed scanner (to be referred to as a sheetfeed driver hereinafter) in a PC. Furthermore, the user has to select the scanner driver corresponding to the scanner to be used during execution of the application. Upon selecting the scanner driver, the application has to unload the scanner driver selected so far, load the newly selected scanner driver onto a memory, and initialize the scanner via the loaded scanner driver. These processes are generally time-consuming. For this reason, the user may feel stress every time he or she switches the scanners.

In order to solve this problem, Japanese Patent Laid-Open No. 2003-234864 adopts a configuration that allows to connect a platen scanner (flatbed scanner) to a sheetfeed scanner, and an image read by the flatbed scanner undergoes image processing in the sheetfeed scanner.

However, a scanner system described in Japanese Patent Laid-Open No. 2003-234864 adopts a configuration in which the sheetfeed scanner and flatbed scanner are connected via a dedicated platen interface, and the flatbed scanner controls the 0sheetfeed scanner. That is, the flatbed scanner does not function unless it is connected to the sheetfeed scanner. In other words, the flatbed scanner completely depends on the sheetfeed scanner (Japanese Patent Laid-Open No. 2003-234864, paragraph 0031). Also, it is estimated that a scanner driver is required only for the sheetfeed scanner. This is because the flatbed scanner passes information of a read image to the sheetfeed scanner, which converts that information into image data (Japanese Patent Laid-Open No. 2003-234864, paragraph 0035). In this manner, in the system described in Japanese Patent Laid-Open No. 2003-234864, only one scanner driver need be prepared, but the sheetfeed scanner has to include a control function of the flatbed scanner, and the dedicated interface that connects these scanners is also required. Furthermore, the flatbed scanner cannot be used when it is solely connected to the PC.

SUMMARY OF THE INVENTION

A feature of the present invention is to shorten a switching time required to switch drivers when a plurality of image reading apparatuses of different types are used. The present invention provides an information reading system comprising an information processing apparatus, a first information reading apparatus which is connected to the information processing apparatus and reads information on a sheet and a second information reading apparatus which is connectable to one of the information processing apparatus and the first information reading apparatus, and reads information on a sheet. The information processing apparatus comprises a control program including a first driver required to control the first information reading apparatus, and a second driver required to control the second information reading apparatus. Control information from the information processing apparatus to the second information reading apparatus is transmitted via the first driver and the second driver.

Further features of the present invention will become apparent from the following description of exemplary embodiments (with reference to the attached drawings).

BRIEF DESCRIPTION OF THE DRAWINGS

FIGS. 6A and 6B are diagrams that describes the arrangement of a plurality of scanner drivers in the PC;

FIG. 13 is a view that describes another example of the user interface;

FIG. 16 is a schematic diagram that describes the arrangement of another image reading apparatus as an example of an information reading apparatus according to the third embodiment;

FIG. 19 is a schematic view that describes the arrangement of another image reading apparatus as an example of an information reading apparatus according to the fourth embodiment;

FIG. 20 is a schematic view that describes the arrangement of another image reading apparatus as an example of an information reading apparatus according to the fourth embodiment;

DESCRIPTION OF THE EMBODIMENTS

An embodiment of the present invention will be described hereinafter. The embodiment to be described hereinafter will help understanding of various concepts such as broader concept, middle concept, and narrower concept of the present invention. Also, the technical scope of the present invention is settled by the scope of the claims, and is not limited by the following embodiment.

An image reading system which includes a plurality of image reading apparatuses of different types (for example, reading schemes) and an information processing apparatus to which these image reading apparatuses can be parallelly or serially connected will be described below.

Note that the image reading system may include at least two image reading apparatuses of two types or more. That is, the system may include one image reading apparatus of a first reading scheme, and two image reading apparatuses of a second reading scheme. This embodiment will be described based on image reading apparatuses of different types. However, identical apparatuses (for example, reading apparatuses of an identical reading scheme), apparatuses having different document sizes to be read (for example, a model which supports an A4 size or less, and that which supports an A3 size or less), apparatuses having different specifications (performances), or apparatuses of different models may be used, and the present invention is not limited to this embodiment.

Connection modes of the image reading apparatuses to the information processing apparatus are not particularly limited. For example, respective image reading apparatuses may be independently and parallelly connected to the information processing apparatus, or all image reading apparatuses may be sequentially connected. Alternatively, parallel and sequential connection modes may be mixed.

This embodiment is characterized in that a driver for a certain image reading apparatus of control programs required to control image reading apparatuses behaves as if it were an application program for a driver of another image reading apparatus.

<First Embodiment>

Figure 1:
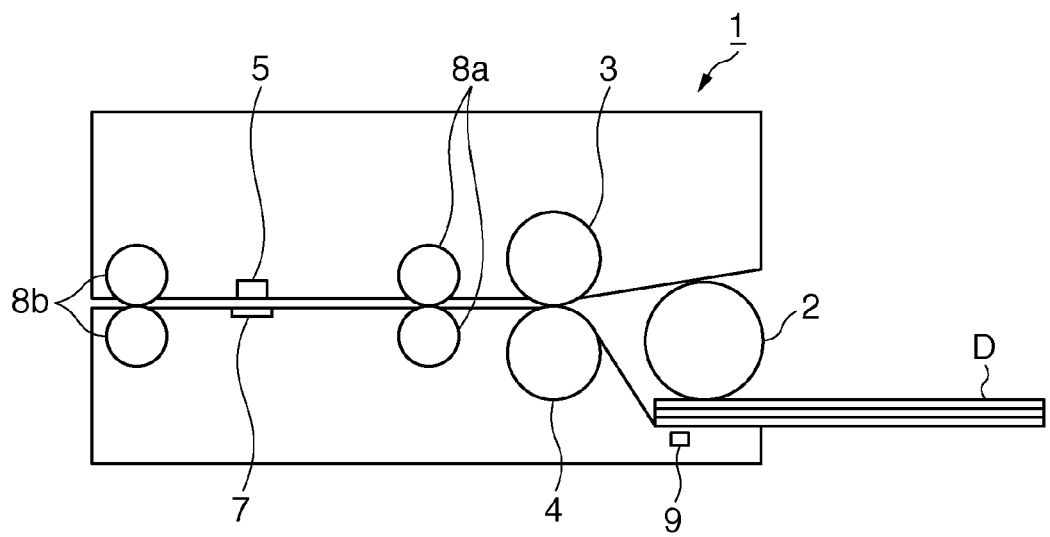
FIG. 1 is a view that describes the arrangement of a sheetfeed scanner according to an embodiment.

FIG. 1 is a view that describes the arrangement of a sheetfeed scanner 1 according to an embodiment. The sheetfeed scanner 1 is an example of a second image reading apparatus whose type is different from that of a first image reading apparatus. The sheetfeed scanner 1 is an example of the second image reading apparatus (second information reading apparatus) connected to the first image reading apparatus (first information reading apparatus).

Note that the sheetfeed scanner is also called a sheet-through scanner. When a scan is started, the sheetfeed scanner 1 determines using a document sensor 9 whether or not document sheets D are set.

If the document sheets D are set, a line image sensor 5 reads a white opposing member 7, and the sheetfeed scanner 1 generates correction data for shading correction. The generated correction data is stored in a memory for each pixel.

A pickup roller 2 and feed roller 3 take a bundle of document sheets D into the sheetfeed scanner 1. A separation roller 4 separates the bundle of document sheets one by one. A first roller pair 8a conveys a separated document sheet D in a sub-scan direction (document convey direction), and the line image sensor 5 reads an image formed on the upper surface of the document sheet D along a main scan direction (a direction perpendicular to the document convey direction).

The sheetfeed scanner 1 executes shading correction to the read image using the correction data read out from the memory. After the image is read, the document sheet D is exhausted outside the apparatus by a second roller pair 8b.

Note that this embodiment exemplifies the sheetfeed scanner 1 which includes a substantially horizontal sheet convey path. Of course, the present invention is not limited to this. For example, the present invention may also be applied to a U-turn path scanner in which a sheet feed unit and exhaust unit are respectively laid out at upper and lower positions, and a document sheet fed from the sheet feed unit is exhausted onto the exhaust unit via a convey path which is curved in, for example, a U-shape.

Figure 2:
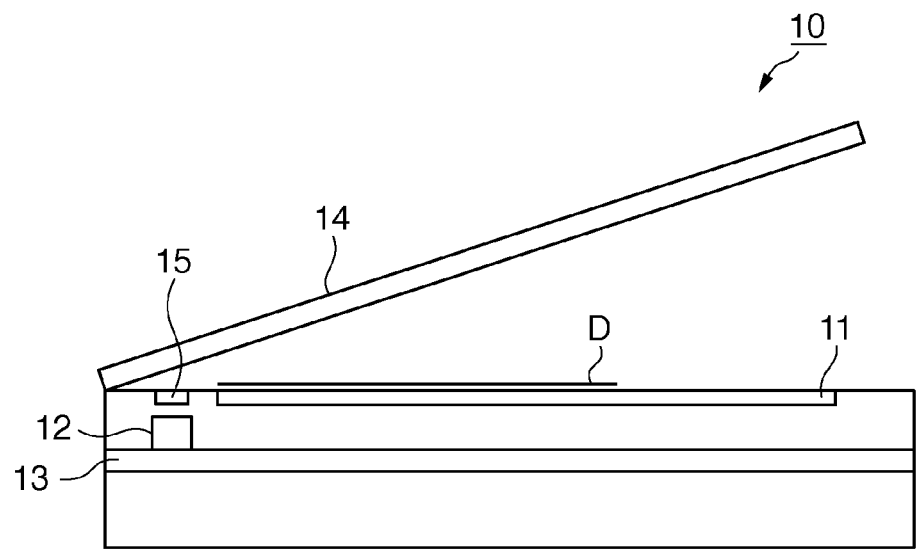
FIG. 2 is a view that describes the arrangement of a flatbed scanner according to the embodiment.

FIG. 2 is a view that describes the arrangement of a flatbed scanner 10 according to the embodiment. The flatbed scanner 10 is an example of the first image reading apparatus.

An operator opens a flatbed cover 14, and places a document sheet D on a glass surface 11. When a scan is started, the flatbed scanner 10 reads a white opposing member 15 using a line image sensor 12, and generates correction data for shading correction. The generated correction data is stored in a memory for each pixel.

The line image sensor 12 reads an image formed on a lower surface of the document sheet D along the main scan direction while it is moved by a moving unit 13 in the sub-scan direction. Also, the flatbed scanner 10 reads out the correction data from the memory, and executes shading correction for an image. Upon completion of the scan, the line image sensor 12 returns to a home position by the moving unit 13.

Note that the aforementioned embodiment describes the flatbed cover 14 as a single plate. Of course, the present invention is not limited to this. For example, an open/close cover which is foldable at nearly the center in the longitudinal direction may be used. With this arrangement, the user can execute a scan while opening the open/close cover, thus further improving the user's convenience.

More specifically, a contact surface with a document sheet, that is, a surface facing the glass surface 11 of the open/close cover is split into a plurality or two parts at nearly the center, which are foldable in directions to approach each other. With this arrangement, the scanner main body side can read an image of a document sheet on the glass surface 11 even in an open/close state of the open/close cover.

In a scan mode, a pre-scan and main scan are executed. For example, during the pre-scan, an image may be read in a light-out mode (a scan while a light source is kept OFF). During the main scan, an image may be read at a predetermined resolution in a light-on mode (a scan while the light source is kept ON). The order of the pre-scan and main scan is not particularly limited.

Furthermore, during the pre-scan, the influence of external light reflected outside a document sheet is read, and image processing that removes the influence of external light from a main-scan image is applied, thus realizing a high-quality scan even in an open state of the flatbed cover 14.

Note that "removing the influence of external light" is to remove the influence of incoming external light (that caused by a change in external light by, for example, a fluorescent lamp) on a region outside a document sheet in a reading region including the document sheet on a platen. More specifically, "removing the influence of external light" means that a portion (region) including the influence of external light which directly enters a sensor from a read image including an image on a document sheet, and includes processing for replacing the region outside the document sheet by a predetermined image.

Also, "outside the document sheet" includes not only an outer circumferential region of the document sheet but also hole portions (punch holes) of, for example, a binder. When a document sheet includes holes, the aforementioned image processing of the present invention can remove the influence of external light in the hole portions. Thus, hole portions can be specified, and subsequent hole erase processing (for example, processing for detecting a feature portion such as a hole shape, and replacing a hole image by a background color (for example, white) of a document sheet can be surely executed, thus providing another effect.

Note that the pre-scan may have a resolution equal or nearly equal to that in the main scan, but the pre-scan may read an image at a resolution lower than the main scan. Then, the reading time can be shortened, thus realizing a high-speed scan.

Figure 3A:
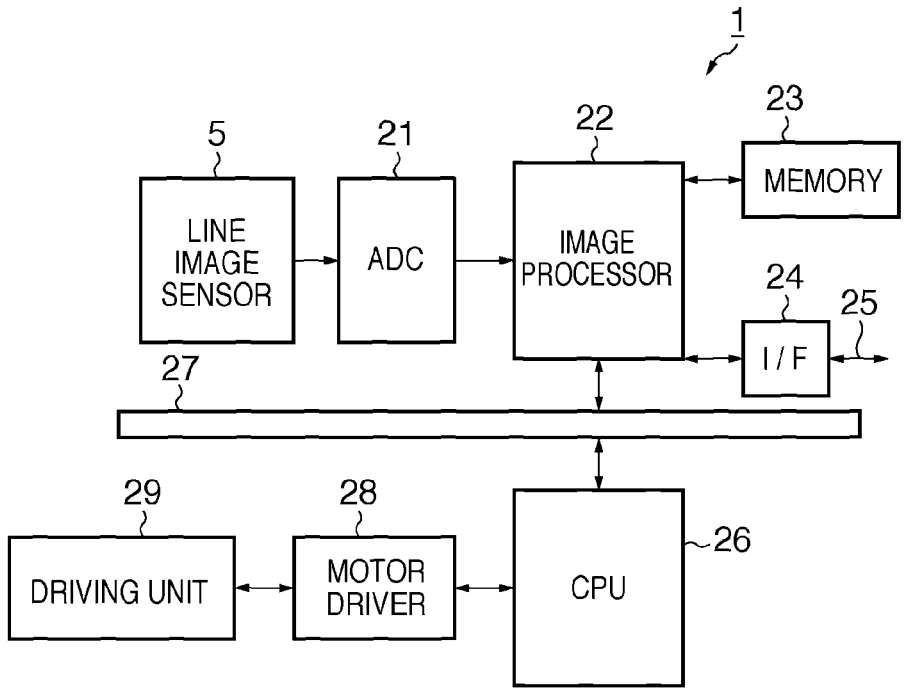
FIG. 3A is a schematic block diagram that describes the arrangement of an electrical circuit of the sheetfeed scanner.

FIG. 3A is a schematic block diagram that describes an electrical circuit of the sheetfeed scanner 1.

An A/D converter 21 applies analog processing including amplification and black level clamping to an output signal from the line image sensor 5, and then converts the output signal into digital data (image data).

An image processor 22 controls the line image sensor 5, A/D converter 21, and the like, and executes various kinds of image processing (for example, shading correction) to image data output from the A/D converter 21.

An image memory 23 stores image data. An interface unit 24 is used to communicate with an external host apparatus (PC or another scanner apparatus).

The interface unit 24 is connected to an external host apparatus such as a PC via a signal cable 25. Note that the interface unit 24 may include a wireless interface such as a wireless LAN, wireless USB, or Bluetooth. Also, the interface unit 24 may include a wired interface such as a USB interface or wired LAN interface. In this embodiment, assume that the interface unit 24 includes a USB interface having a USB hub function, for the sake of simplicity.

A CPU 26 is a control unit which controls the sheetfeed scanner 1. The image processor 22 and CPU 26 are connected via a bus 27. The CPU 26 accesses the image memory 23 via the image processor 22.

A driving unit 29 includes a motor for driving the pickup roller 2, feed roller 3, separation roller 4, and roller pairs 8a and 8b. A motor driver 28 is a control circuit which controls the driving unit 29 based on an instruction from the CPU 26.

Figure 3B:
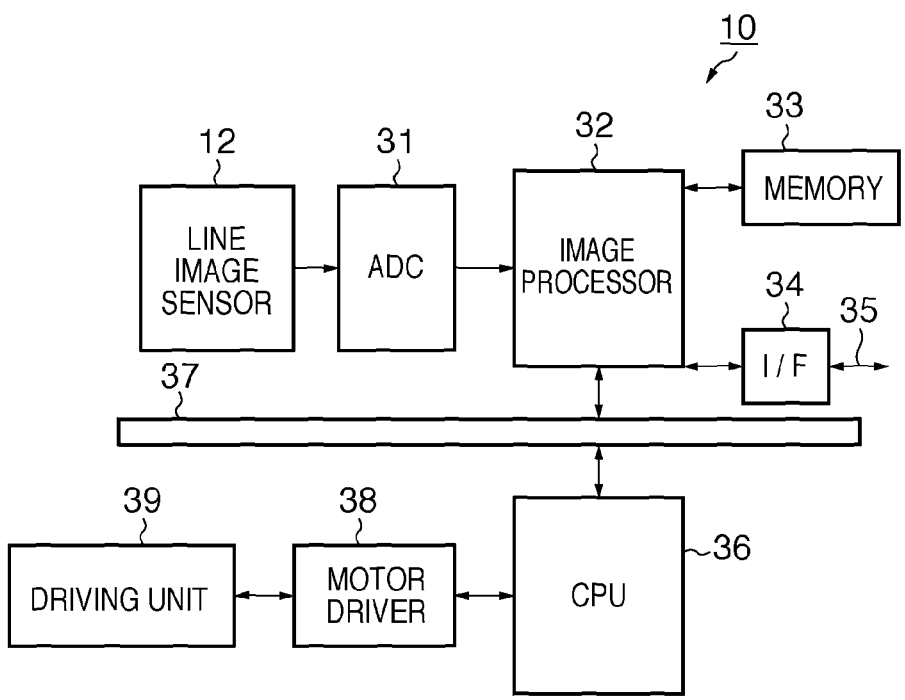
FIG. 3B is a schematic block diagram that describes the arrangement of an electrical circuit of the flatbed scanner.

FIG. 3B is a schematic block diagram that describes the arrangement of an electrical circuit of the flatbed scanner 10.

An A/D converter 31 applies analog processing including amplification and black level clamping to an output signal from the line image sensor 12, and then converts the output signal into digital data (image data).

An image processor 32 controls the line image sensor 12, A/D converter 31, and the like, and executes various kinds of image processing (for example, shading correction) to image data output from the A/D converter 31.

An image memory 33 stores image data. An interface unit 34 is used to communicate with an external host apparatus (PC or another scanner apparatus).

The interface unit 34 is connected to an external host apparatus such as a PC via a signal cable 35. Note that the interface unit 34 may include a wireless interface such as a wireless LAN, wireless USB, or Bluetooth.

Also, the interface unit 34 may include a wired interface such as a USB interface or wired LAN interface. In this embodiment, assume that the interface unit 34 includes a USB interface having a USB hub function, for the sake of simplicity.

A CPU 36 is a control unit which controls the flatbed scanner 10. The image processor 32 and CPU 36 are connected via a bus 37. The CPU 36 accesses the image memory 33 via the image processor 32.

A driving unit 39 includes a motor for driving the moving unit 13. A motor driver 38 is a control circuit which controls the driving unit 39 based on an instruction from the CPU 36.

Figure 3C:
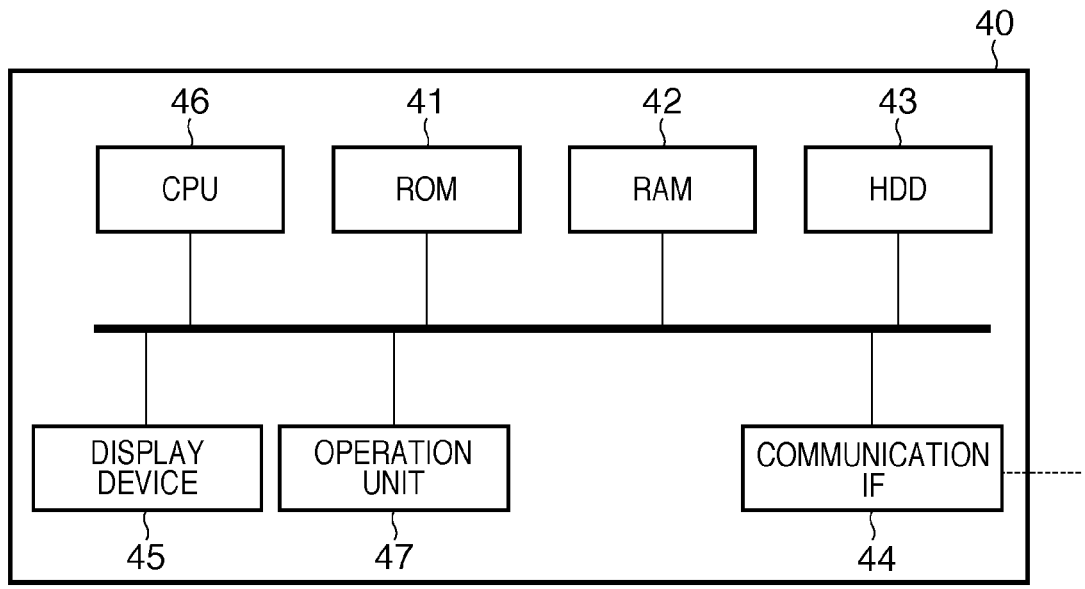
FIG. 3C is a schematic block diagram that describes the arrangement of an electrical circuit of a PC according to the embodiment.

FIG. 3C is a schematic block diagram that describes the arrangement of an electrical circuit of a PC 40 according to the embodiment.

A CPU 46 is a control unit which systematically controls respective unit of a computer based on computer programs. The CPU 46 controls the sheetfeed scanner 1 and flatbed scanner 10 according to an application program and scanner drivers.

A ROM 41 is a nonvolatile storage unit which stores control programs such as firmware. A RAM 42 is a volatile storage unit which serves as a work area. A hard disk drive (HDD) 43 is a large-capacity storage unit.

A display device 45 is a display unit used to display various kinds of information for the user. An operation unit 47 is an input unit including a pointing device and a keyboard.

A communication interface 44 is a communication unit including a network communication card. The CPU 46 communicates with the sheetfeed scanner 1 and flatbed scanner 10 via the communication interface 44.

Figure 4:
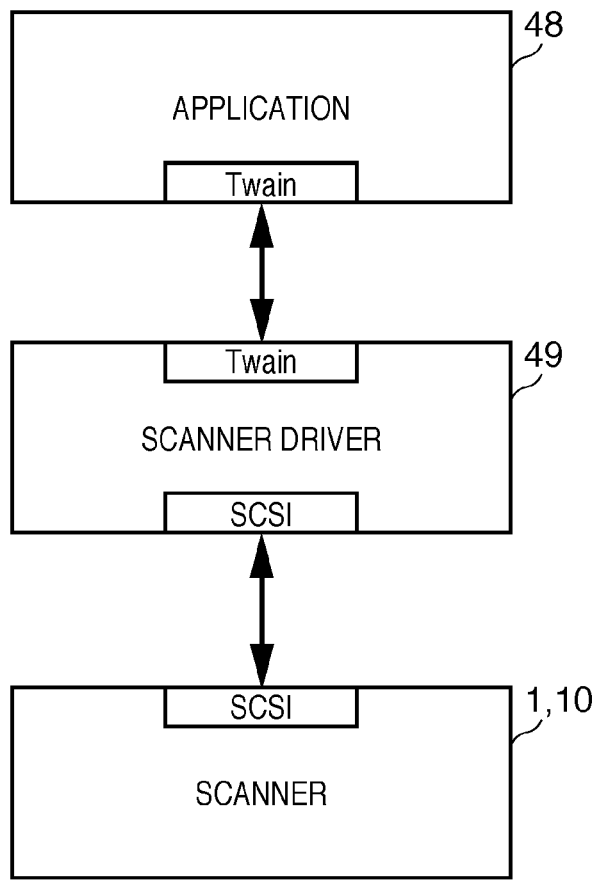
FIG. 4 is a diagram that describes the arrangement of an application and scanner driver on the PC.

FIG. 4 is a diagram that describes the arrangement of an application and scanner driver on the PC 40. Assume that one of the sheetfeed scanner 1 and flatbed scanner 10 is solely connected to the PC 40.

When the user purchases a scanner, he or she installs an application 48 and scanner driver 49 in the HDD 43 of the PC. The application 48 includes an image edit program, album program, and document edit program.

Note that the application 48 can exchange information with a first or second driver. More specifically, the application 48 is an example of an application program which receives data of an image from the first or second driver.

The installed application 48 controls the scanner 1 or 10 via the scanner driver 49, and executes image processing for image data received from the scanner driver 49. Hence, the application 48 and CPU 46 serve as an image processing unit which receives image data from a first or second control unit and executes image processing.

The application 48 and scanner driver 49, and the scanner driver 49 and scanner 1 or 10 communicate with each other respectively using predetermined protocols. In this embodiment, assume that the application 48 and scanner driver 49 communicate with each other using a protocol specified by the Twain specification. The protocol specified by the Twain specification is a first driver interface used to communicate with the first or second driver, and is an example of an application interface used to communicate with the application program.

Also, the protocol specified by the Twain specification is an example of a first interface used to allow the image processing unit to communicate with the first or second control unit, a second interface used to allow the first control unit to communicate with the image processing unit, a third interface used to allow the first control unit to communicate with the second control unit, and a fourth interface used to allow the second control unit to communicate with the image processing unit. Assume that the scanner driver 49 and scanner 1 or 10 communicate with each other using a protocol specified by the SCSI specification. In this way, the protocol specified by the SCSI specification is an interface used to communicate with the image reading apparatus. However, the present invention is not limited to the protocol specified by the SCSI specification, but may adopt other protocols. Note that control commands and image data are exchanged among the scanner, driver, and application via these protocols.

Figure 5A:
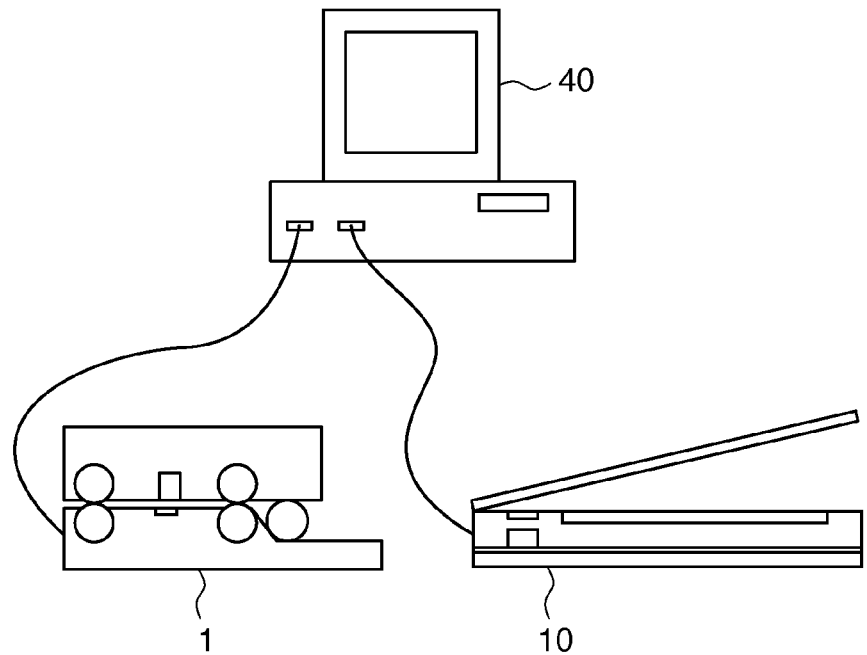
FIGS. 5A and 5B are views when the sheetfeed scanner and flatbed scanner are simultaneously connected to the PC.
Figure 5B:
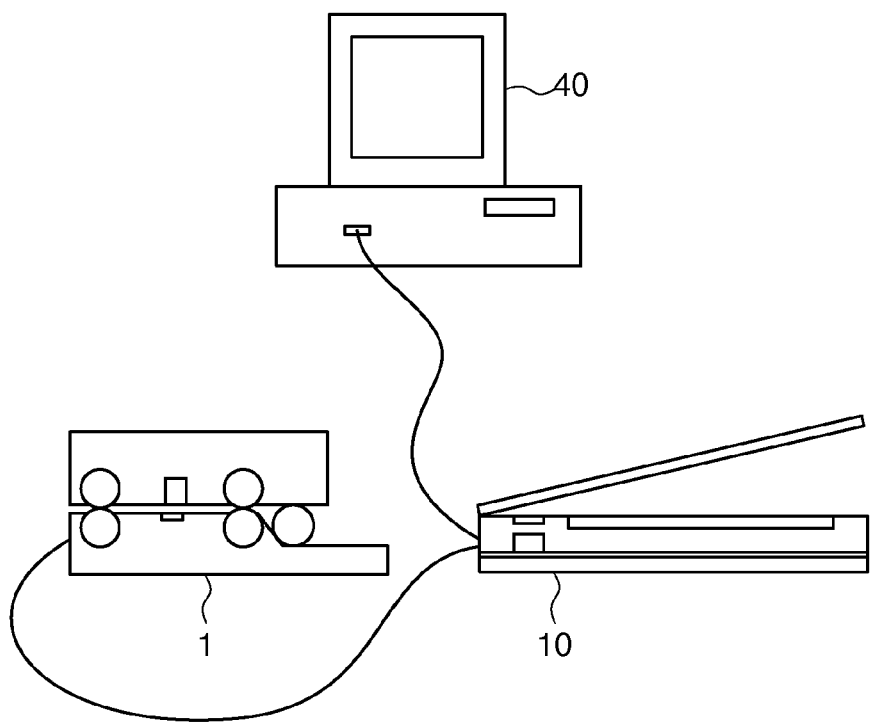

FIGS. 5A and 5B are views when the sheetfeed scanner 1 and flatbed scanner 10 are simultaneously connected to the PC 40.

In FIG. 5A, the sheetfeed scanner 1 and flatbed scanner 10 are parallelly connected to the PC 40. In FIG. 5B, the interface unit 34 of the flatbed scanner 10 has a hub function to sequentially connect the PC 40→flatbed scanner 10→sheetfeed scanner 1. In either connection state, the CPU 46 of the PC 40 recognizes that the two scanners are connected. This embodiment can be easily understood if it is assumed that the interface unit 34 includes a USB hub.

FIGS. 6A and 6B are diagrams that describes the arrangement of a plurality of scanner drivers in the PC 40. Conventionally, as shown in FIG. 6A, scanner drivers and scanners are arranged to have one-to-one correspondence. For this reason, a sheetfeed driver 49a and flatbed driver 49b are completely independent of each other, and they never cooperate with each other. Note that the user has to respectively install the sheetfeed driver 49a and flatbed driver 49b in the PC 40, and switch the scanner driver by an application 48 according to the scanner to be used. Upon switching the scanners, the application 48 executes unload processing of the scanner driver before switching, load processing of the scanner driver after switching, and initialization processing of the scanner. Hence, this processing time is relatively long. According to this embodiment, as will be described in detail later, since the need for the aforementioned complicated processing such as the load processing of the scanner driver and initialization processing of the scanner can be obviated by cooperation of the first and second drivers, the processing time required to control the reading operations of the sheetfeed scanner and flatbed scanner can be shortened even in the connection state shown in FIG. 6A.

Note that the sheetfeed driver 49a and CPU 46 serve as the second control unit required to control the second image reading apparatus. The flatbed driver 49b and CPU 46 serve as the first control unit required to control the first image reading apparatus.

FIG. 6B shows the arrangement of the scanner drivers of this embodiment. The flatbed driver 49b is an example of the first driver required to control the first image reading apparatus.

The sheetfeed driver 49a is an example of the second driver required to control the second image reading apparatus. When the CPU 46 activates the application 48, it loads the flatbed driver 49b onto the RAM 42 first.

Furthermore, the CPU 46 loads the sheetfeed driver 49a onto the RAM 42 according to the flatbed driver 49b. For the sheetfeed driver 49a, the flatbed driver 49b assumes the same role as the application 48. That is, the flatbed driver 49b includes an interface used to communicate with the sheetfeed driver 49a so as to behave as the application 48 for the sheetfeed driver 49a.

This interface is the aforementioned protocol specified by the Twain specification, and is an example of a second driver interface used to allow the first driver to communicate with an application interface included in the second driver.

Note that a switching operation between the sheetfeed scanner 1 and flatbed scanner 10 is executed on a setting screen of the flatbed driver 49b activated from the application 48.

The application program 48 receives data of an image read by the first image reading apparatus (flatbed scanner 10) via the first driver (flatbed driver 49b).

The application program 48 receives data of an image read by the second image reading apparatus (sheetfeed scanner 1) via the first driver and second driver (sheetfeed driver 49a).

As described above, both the flatbed driver 49b and sheetfeed driver 49a are always loaded on the RAM 42 during execution of the application 48.

Hence, the flatbed driver 49b and sheetfeed driver 49a are loaded once onto the RAM 42 when the application 48 is activated, and are neither unloaded nor re-loaded during execution of the application 48. Therefore, according to this embodiment, the scanner switching speed is much higher than the related art.

Figure 7:
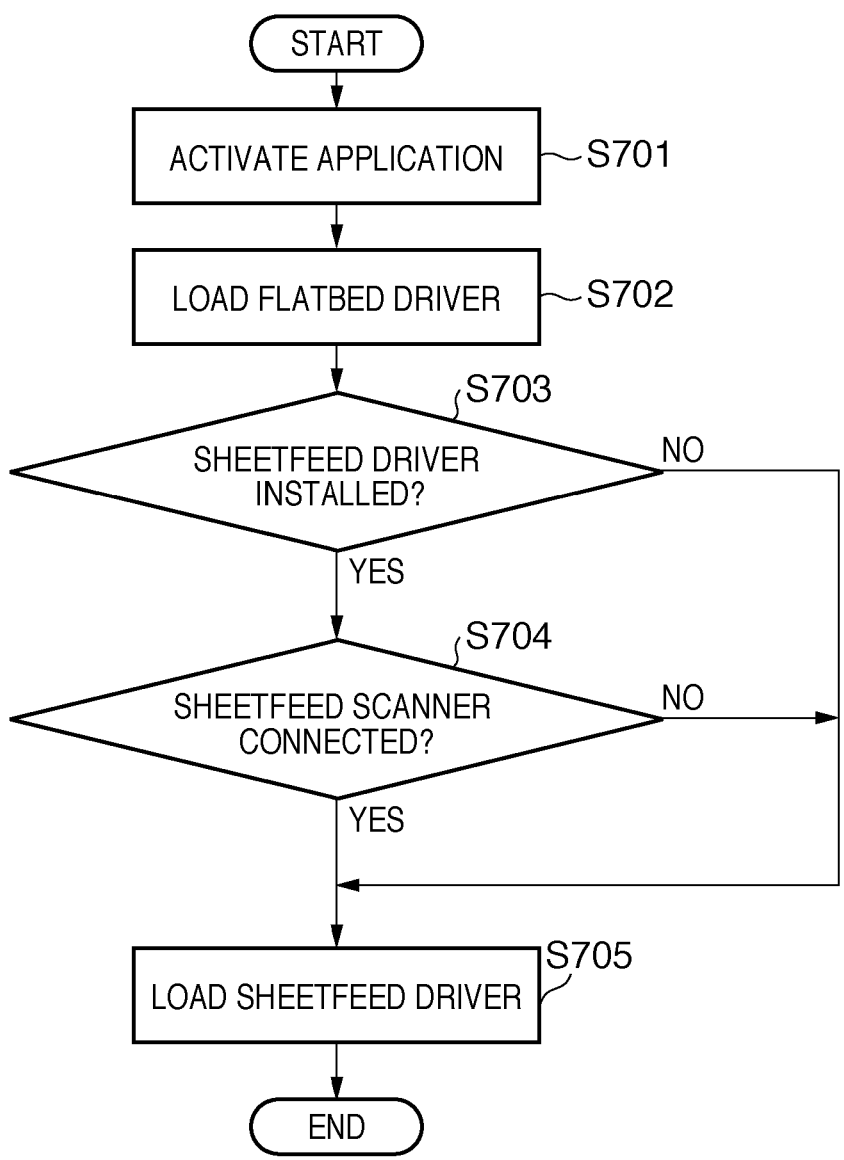
FIG. 7 is a flowchart that describes flatbed driver load processing executed by an application.

FIG. 7 is a flowchart that describes the load processing of the flatbed driver 49b executed by the application 48. Upon reception of an activation instruction of the application 48 from the operation unit 47, the CPU 46 of the PC 40 loads the application 48 stored in the HDD 43 onto the RAM 42 in step S701. Then, the application 48 is activated.

In step S702, the CPU 46 loads the flatbed driver 49b onto the RAM 42 according to the application 48. In this way, when the application program is activated when both the first and second image reading apparatuses are connected to the information processing apparatus, the application program (CPU 46) loads the first driver onto a memory of the information processing apparatus.

The CPU 46 determines in step S703 whether or not the sheetfeed driver 49a has already been installed according to the flatbed driver 49b. In this manner, the CPU 46 serves as a determination unit which determines whether or not the second driver has been installed in the information processing apparatus.

For example, the CPU 46 refers to a list of sheetfeed drivers compatible with the flatbed driver 49b to search the HDD 43 for the sheetfeed driver described in this list. Alternatively, the CPU 46 searches a registry managed by an OS (Operating System) for that sheetfeed driver. If the sheetfeed driver is found by the search, the sheetfeed driver is already installed. In this case, the process advances to step S704. Note that if no sheetfeed driver is installed, the CPU 46 ends the load processing of the sheetfeed driver.

The CPU 46 determines in step S704 whether or not the sheetfeed scanner 1 is connected to the PC 40. If the sheetfeed scanner 1 is connected to the PC 40, the process advances to step S705. If no sheetfeed scanner 1 is connected, the CPU 46 ends the load processing of the sheetfeed driver. Hence, the CPU 46 serves as a load unit which does not execute the load processing of the second driver when the second driver is not installed in the information processing apparatus.

In step S705, the CPU 46 reads out the sheetfeed driver 49a from the HDD 43 according to the flatbed driver 49b, and loads it onto the RAM 42. In this way, the first driver loads the second driver onto the memory of the information processing apparatus. That is, the CPU 46 serves as a load unit which loads the second driver onto the memory of the information processing apparatus when the second driver is installed in the information processing apparatus. Note that when the CPU 46 unloads the flatbed driver 49b according to the application 48, it also unloads the sheetfeed driver 49a.

Note that FIG. 7 above has explained, as an example of the load processing, the case in which the second driver (sheetfeed driver) is activated after the first driver (flatbed driver) is activated upon activation of the application 48. Of course, the present invention is not limited to this. For example, both the drivers may be simultaneously activated upon activation of the application, or the first driver may be activated after activation of the second driver. In any case, since the first and second drivers are activated, it is very convenient for the user to promptly use the sheetfeed scanner 1 and flatbed scanner 10.

That is, the PC 40 as an example of the information processing apparatus, to which a plurality of information reading apparatuses are connectable, includes a first driver used to control a first information reading apparatus of the plurality of information reading apparatuses, a second driver used to control a second information reading apparatus different from the first information reading apparatus of the plurality of information reading apparatuses, and an application program which exchanges information (for example, receives information) with the first or second driver, and the first and second drivers may be respectively activated upon activation of the application program. A state in which the first and second drivers are activated is defined as a standby state before execution of a scan and, after that, the first and second information reading apparatuses are ready to promptly start reading operations.

Note that the activation timings of the first and second drivers are not particularly limited. For example, these timings may be synchronized with the activation timing of the application program. Or the first and second drivers may be simultaneously activated based on an operation (a scan setting change operation, scanner selection operation, etc.) on the PC 40. Or the second driver may be activated upon activation of the first driver, or vice versa. In any case, since the state in which the first and second drivers are activated is defined as the standby state before execution of a scan, it is very convenient for the user to promptly use the sheetfeed scanner 1 and flatbed scanner 10.

As described above, since the two drivers are automatically activated, a time required until the standby state is set can be shortened. Of course, the activation timings of the first and second drivers may not be synchronized with that of the application program, or the second driver may be activated upon activation of the first driver or vice versa.

In the state in which the plurality of information reading apparatuses are connected to the PC and the respective drivers are ready to use, read images by the respective information reading apparatuses may be combined by a control program (for example, the application program). In this manner, compared to the conventional apparatus which has to individually connect scanners, and has to use one scanner by switching scanner drivers every time the scanner is switched, the user's convenience can be further improved.

For example, when the user wants to read a front cover or back cover, and a plurality of document sheets laid out between the front and back covers as one file, the application program may issue instructions to the scanners so that the flatbed scanner reads the front or back cover, and the sheetfeed scanner reads the plurality of document sheets. In this case, the respective scanners may be driven simultaneously, independently, or sequentially (in a predetermined order).

Images read by the respective scanners may be received by the application program, and may be combined into one image file upon execution of the application program. The combining processing need not always be executed by the application program. For example, the flatbed driver may include an image processing function to execute the combining processing. Or the sheetfeed driver may include an image processing function to execute the combining processing. For example, one of the flatbed driver and sheetfeed driver may send read images to the other driver, which may execute the combining processing. One or both of the scanner main bodies may include an image processing unit, which may execute the combining processing of read images.

Furthermore, instruction commands to the respective scanners may include information that designates a reading order. For example, the flatbed scanner may read images first, and then the sheetfeed scanner may read images, or vice versa.

In this case, their read images may be sent to the PC, which may combine these images into one image file. Alternatively, an image read by the flatbed scanner may be sent to the sheetfeed scanner to be combined with read images of the sheetfeed scanner, and the combined images may be finally sent to the PC. Of course, images read by the sheetfeed scanner may be sent to the flatbed scanner to be combined with a read image of the flatbed scanner, and the combined images may be finally sent to the PC.

Note that the operations in the aforementioned example are basically executed based on an instruction command (reading instruction) from the PC. Alternatively, the respective scanners may include the same functions as those in the PC, and an operation unit which allows the user to make the same operations as those of the PC may be provided to each scanner, so that the scanner may issue the same instruction command as the PC to another scanner. In this case, the control program such as the aforementioned application program may be executed by the same function (for example, a CPU) as that of the PC included in the scanner.

In the aforementioned example, the connection order of the scanners are not particularly limited. For example, the sheetfeed scanner may be connected to the flatbed scanner connected to the PC, or the flatbed scanner may be connected to the sheetfeed scanner connected to the PC. Also, another peripheral device such as a scanner other than the aforementioned scanners may be connected.

Figure 8:
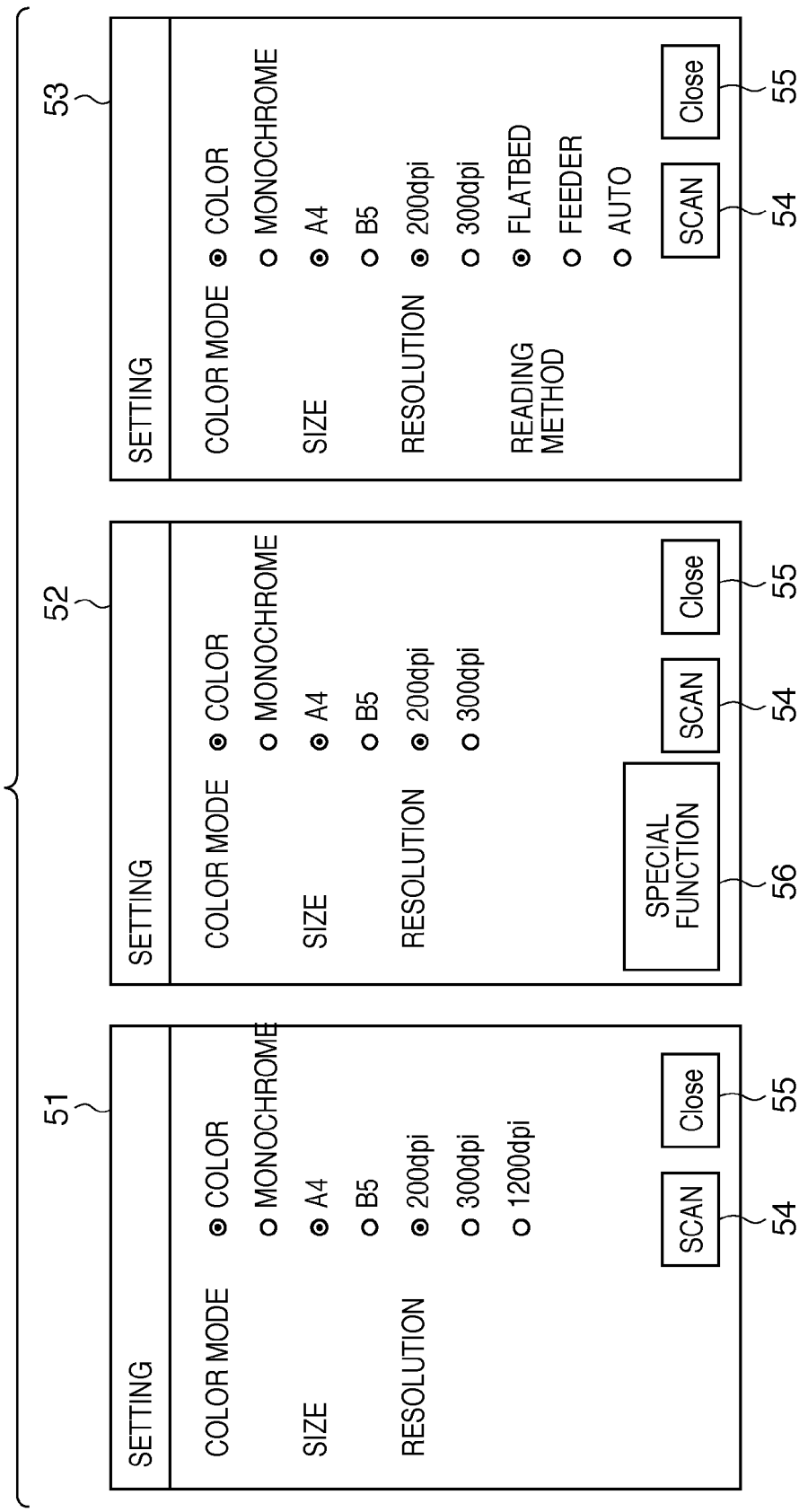
FIG. 8 is a view that describes a user interface displayed by the flatbed driver.

FIG. 8 is a view that describes an example of a user interface displayed by the flatbed driver. A user interface 51 is called by the application 48 and is displayed on the display device 45 when only the flatbed scanner 10 is connected to the PC 40.

That is, the user interface 51 is that of the flatbed driver 49b. The user interface 51 allows the user to set a color mode, reading size, and resolution.

Upon detection of pressing of a scan button 54, the CPU 46 instructs the scanner driver to start a scan. Upon detection of pressing of a Close button 55, the CPU 46 closes the user interface.

A user interface 52 is called by the application 48 and is displayed on the display device 45 when only the sheetfeed scanner 1 is connected to the PC 40. That is, the user interface 52 is that of the sheetfeed driver 49a. Note that a special function button 56 is added to the user interface 52.

The sheetfeed scanner 1 can scan document sheets in the larger quantities per unit time compared to the flatbed scanner 10. For this reason, the user may insert a blank document sheet in a bundle of document sheets by mistake. The sheetfeed scanner 1 has a function of detecting such blank document sheet and skipping image conversion of that blank document sheet (blank detection function). In this embodiment, upon detection of pressing of the special function button 56, the CPU 46 displays a setting dialog 57 used to set ON/OFF of the blank detection function on the display device 45.

Figures 9, 10:
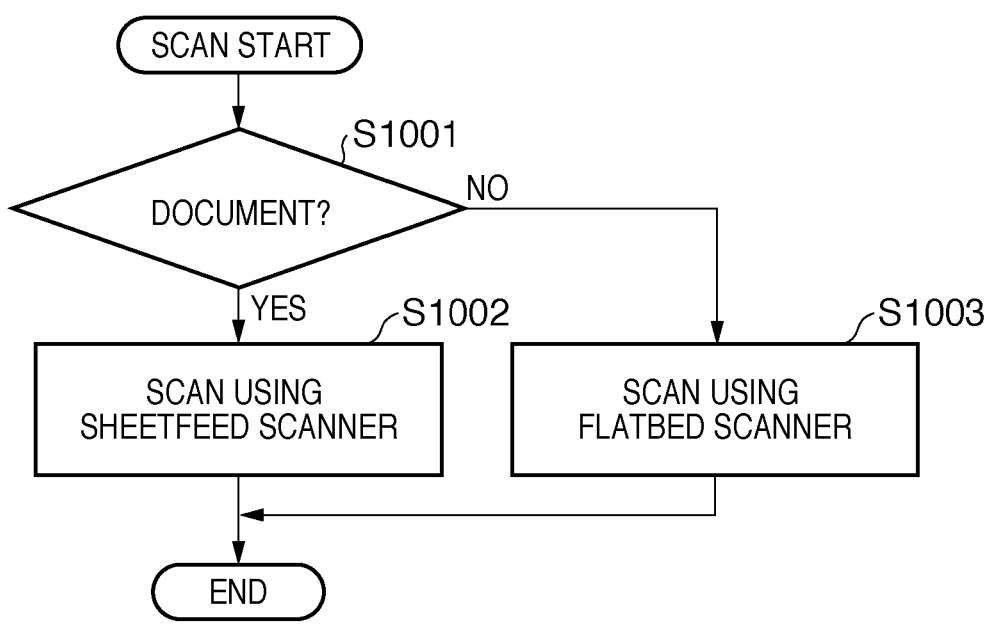
FIG. 9 is a view that describes a setting diagram used to set ON/OFF of a blank detection function.
FIG. 10 is a flowchart that describes an example of an automatic reading method.

FIG. 9 shows the setting dialog 57 used to set ON/OFF of the blank detection function. An initial value of this setting is "OFF".

Referring back to FIG. 8, a user interface 53 is displayed when both the flatbed scanner 10 and sheetfeed scanner 1 are connected to the PC 40.

When the load processing of the sheetfeed driver 49a has succeeded in step S705, the CPU 46 displays the user interface 53 on the display device 45 according to the flatbed driver 49b.

When the load processing of the sheetfeed driver 49a has failed, the CPU 46 displays the user interface 51. Compared to the user interface 51, setting items of a reading method (an image reading apparatus used in reading processing) are added to the user interface 53.

Hence, the user can selectively use the flatbed scanner 10 and sheetfeed scanner 1 using the setting items of the reading method. In this way, the CPU 46 and display device 45 serve as a display unit which displays the user interface used to prompt the operator to select the first or second image reading apparatus.

The flatbed driver 49b (CPU 46) saves the color mode, resolution, size, and the like set by the user. For this reason, when the user directly selects the sheetfeed driver 49a on the application 48, the contents of the color mode, resolution, and size set on the user interface 53 are not applied to the sheetfeed driver 49a.

That is, when the user directly uses the sheetfeed driver 49a on the application 48, setting information set on the user interface 53 is not restored. The setting information is saved at a predetermined location (for example, a registry file) in the PC 40. The registry file itself is stored in the HDD 43.

The aforementioned blank detection function is set to be OFF since the flatbed driver 49b executes initialization processing when it loads the sheetfeed driver 49a.

As selection items of the resolution, only resolutions supported by both the flatbed driver 49b and sheetfeed driver 49a are displayed. The flatbed driver 49b (CPU 46) acquires resolutions supported by the sheetfeed driver 49a from the sheetfeed driver 49a, and extracts only resolutions, which are also supported by the flatbed driver 49b, from the acquired resolutions.

In this way, the resolutions which are selectable on the user interface 53 are decided. As for size and color mode selection items, the same extraction processing may be executed. As a result, only sizes and color modes commonly adopted by the sheetfeed driver 49a and flatbed driver 49b can be extracted and reflected on the user interface 53.

In this manner, the CPU 46 serves as a unit which compares functions supported by the first image reading apparatus with those supported by the second image reading apparatus, and extracts functions common to the first and second image reading apparatuses. Also, the CPU 46 and display device 45 serve as a display unit which displays setting items of the extracted functions on the user interface.

FIG. 10 is a flowchart that describes an example of an automatic reading method. The user interface 53 shown in FIG. 8 has a selection item "auto" as those of the reading method. When it is detected that the user selects the reading method (auto) and presses the scan button 54, the CPU 46 starts a scan. Although not shown, a scan may be started when the user presses an operation button (for example, a scan start button) on the sheetfeed scanner 1 or flatbed scanner 10 side.

The CPU 46 determines in step S1001 whether or not document sheets are placed on the sheetfeed scanner 1. For example, the CPU 46 inquires the sheetfeed driver 49a via the flatbed driver 49b as to whether or not document sheets are placed on the sheetfeed scanner 1.

The sheetfeed driver 49a (CPU 46) acquires detection information of the document sensor 9, and informs the flatbed driver 49b of the presence/absence of document sheets. If document sheets are placed on the platen of the sheetfeed scanner 1, the process advances to step S1002.

In step S1002, the CPU 46 transmits a scan start command to the sheetfeed driver 49a via the flatbed driver 49b. Note that the CPU 46 serves as a first transmission unit which transmits an image reading start command to the flatbed scanner 10 (first image reading apparatus) when the user selects the flatbed scanner 10 on the user interface 53. Note that the scan start command is transmitted to the sheetfeed driver 49a via the flatbed driver 49b, and after that, the command is sent to the sheetfeed scanner 1 via the flatbed scanner 10 in practice. In this case, the flatbed scanner 10 checks the received scan start command (for the sheetfeed scanner 1) using, for example, the CPU 36, and if that command is not addressed to the self scanner, it transfers that command to the sheetfeed scanner 1.

Upon reception of the scan start command, the sheetfeed driver 49a transfers that scan start command to the CPU 26 of the sheetfeed scanner 1. In this way, the CPU 46 serves as a second transmission unit which transmits the scan start command (image reading start command) to the second image reading apparatus when the user selects the sheetfeed scanner 1 (second image reading apparatus) via the user interface 53.

Upon reception of the scan start command, the CPU 26 of the sheetfeed scanner 1 starts scan processing. The CPU 26 generates image data by controlling the line image sensor 5 and image processor 22, and transfers the image data to the sheetfeed driver 49a. The sheetfeed driver 49a transfers the image data to the flatbed driver 49b.

In this manner, the sheetfeed driver 49a controls the CPU 46 to serve as a unit which passes the image data transferred from the second image reading apparatus to the first driver. Furthermore, the flatbed driver 49b transfers the image data to the application 48. Hence, the flatbed driver 49b controls the CPU 46 to serve as a unit which passes the image data passed from the second driver to the application program.

On the other hand, if no document sheet is placed on the sheetfeed scanner 1, the process advances to step S1003. In step S1003, the CPU 46 transmits a scan start command to the flatbed driver 49*b*.

Upon reception of the scan start command, the flatbed driver 49*b* transfers the scan start command to the CPU 36 of the flatbed scanner 10. Upon reception of the scan start command, the CPU 36 of the flatbed scanner 10 starts scan processing.

The CPU 36 generates image data by controlling the line image sensor 12 and image processor 32, and transfers the image data to the flatbed driver 49*b*. The flatbed driver 49*b* transfers the image data to the application 48.

Note that when the blank detection function is set to be ON, the blank detection function of the flatbed driver 49*b* or sheetfeed driver 49*a* checks a document image to determine whether or not the read document sheet is a blank document sheet. If the read document sheet is a blank document sheet, the corresponding driver discards the image data. For example, the CPU 46 or image processor 22 or 32 converts an image into a binary image. Then, the CPU 46 or image processor 22 or 32 counts the number of black pixels in the converted binary image, and determines that the document image is that of a blank document sheet when the number of black pixels is equal to or smaller than 20% of the number of pixels of the entire image.

How to exchange commands from the PC 40 to the sheetfeed scanner 1 via the flatbed scanner 10 will be described in more detail below. In this embodiment, the flatbed scanner 10 includes the USB hub. For this reason, as shown in FIG. 5B, even when the flatbed scanner 10 lies between the PC 40 and sheetfeed scanner 1, the PC 40 can directly transmit a command to the sheetfeed scanner 1. That is, the connection modes in FIGS. 5A and 5B have no difference for the CPU 46 in the PC 40 in terms of a USB level. In this way, the scanner reading operations of the sheetfeed scanner 1 and flatbed scanner 10 are independent of each other in terms of the scanner reading processing.

That is, for the sheetfeed scanner 1, the flatbed scanner 10 is merely a relay point between signals to and from the PC 40. The CPU 36 and image processor 32 of the flatbed scanner 10 are not involved in relaying of signals of the sheetfeed scanner 1. Such fact is contrastive to the dependence of the sheetfeed driver 49*a* on the flatbed driver 49*b*.

Command analysis processing executed by the flatbed driver 49*b* in cooperation with the CPU 46 will be described below.

When the application 48 sends a command to the sheetfeed driver 49*a* in a state in which the sheetfeed scanner 1 and flatbed scanner 10 are simultaneously connected to the PC 40, that command is sent via the flatbed driver 49*b*. In this case, the command from the PC 40 to the sheetfeed scanner 1 temporarily passes through the flatbed scanner 10 as information. For example, the CPU 36 of the flatbed scanner 10 determines that the received command is not addressed to the self scanner, and can control to transfer that command to the sheetfeed scanner 1. Of course, the interface unit 34 of the flatbed scanner 10 may include a command checking function, and the command to the sheetfeed scanner 1 may be directly transferred from the interface unit 34 to the sheetfeed scanner 1. Alternatively, the flatbed scanner 10 may additionally include a command checking unit to distribute commands. In this way, the command to the sheetfeed scanner 1 goes through the flatbed scanner 10.

For this purpose, the flatbed driver 49*b* analyzes a command from the application 48, and controls the flatbed scanner 10 and sheetfeed scanner 1 according to the analysis result.

Which of the flatbed scanner 10 and sheetfeed scanner 1 is to be controlled depends on the setting on the user interface 53. When the user selects "flatbed" as the reading method on the user interface 53, the flatbed driver 49*b* receives a command from the application 48 and controls the flatbed scanner 10.

On the other hand, when the user selects "feeder" as the reading method, the flatbed driver 49*b* transfers a command from the application 48 to the sheetfeed driver 49*a* intact.

The sheetfeed driver 49*a* receives the command from the application 48 via the flatbed driver 49*b*, and controls the sheetfeed scanner 1.

When the user selects "auto" as the reading method, one scanner apparatus is selected depending on whether or not document sheets are set on the sheetfeed scanner 1. As a command transmission/reception method, that according to the selected scanner apparatus is selected.

Processing until a scan image (image data) output from the scanner reaches the application 48 via the scanner driver will be described below. When the user selects "flatbed" as the reading method, the flatbed driver 49*b* controls the flatbed scanner 10 to acquire an image, and passes the scan image to the application 48. When the user selects "feeder" as the reading method, the flatbed driver 49*b* acquires an image from the sheetfeed driver 49*a*, and passes that image to the application 48 intact.

As described above, according to this embodiment, when the sheetfeed scanner 1 and flatbed scanner 10 are simultaneously connected to the PC 40, the user can use the two scanners via the flatbed driver 49*b*. Hence, once the user selects the flatbed driver 49*b* on the application 48, he or she need not re-select the driver to switch the scanner to be used.

That is, the need for the unload processing of the flatbed driver 49*b* and the load processing of the sheetfeed driver 49*a*, which are required in the related art, can be obviated. This is because the flatbed driver 49*b* has already loaded the sheetfeed driver 49*a* onto the RAM 42 at the time of activation of the application 48. Therefore, the need for a processing time required to execute the unload and load processes upon switching of the scanner drivers can be obviated. The effect of this embodiment is high in a use environment in which the user frequently switches the sheetfeed scanner 1 and flatbed scanner 10.

Since the flatbed driver 49*b* supports a protocol (for example, Twain) required to communicate with the sheetfeed driver 49*a* as an application program, the flatbed driver 49*b* appears as an application for the sheetfeed driver 49*a*.

Hence, when the user who already possesses the flatbed scanner 10 additionally purchases a new sheetfeed scanner 1, he or she can use both the flatbed scanner 10 and the new sheetfeed scanner 1 via the flatbed driver 49*b*.

Also, a vendor need not upgrades the version of the flatbed driver 49*b* to support the sheetfeed scanner 1 as a new product. This is because the flatbed driver 49*b* already includes a protocol required to communicate with the sheetfeed driver 49*a*.

In this embodiment, the sheetfeed driver 49*a* is used via the flatbed driver 49*b*. Alternatively, the flatbed driver 49*b* may be used via the sheetfeed driver 49*a*. In this case, in the above description, the flatbed driver 49*b* may be read as the sheetfeed driver 49*a*, and the flatbed scanner 10 may be read as the sheetfeed scanner 1.

Figure 11:
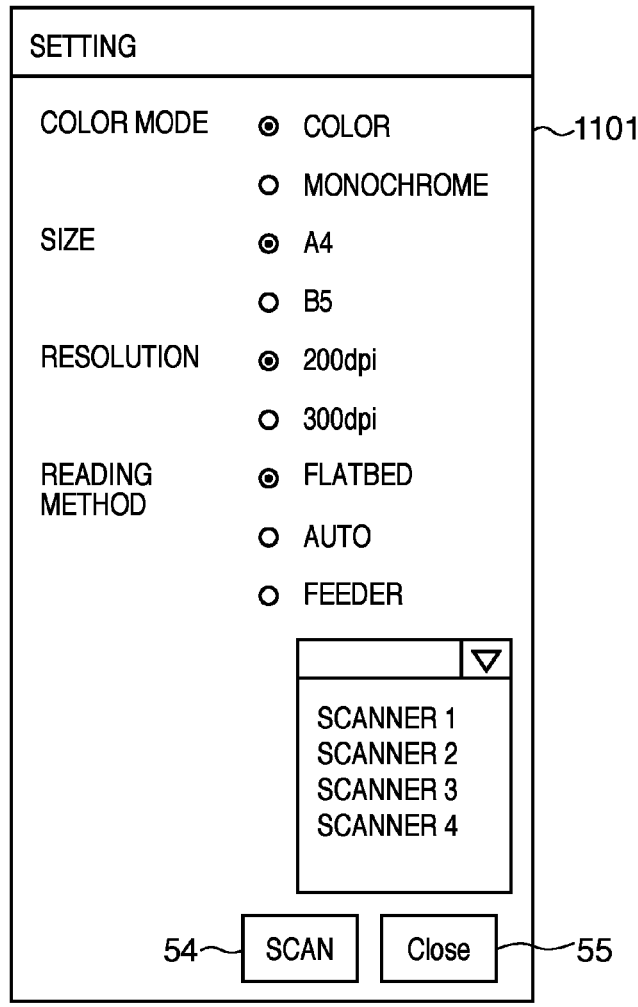
FIG. 11 is a view that describes an example of a common user interface required to use three or more scanners connected to the PC.

FIG. 11 is a view that describes an example of a common user interface 1101 required to use three or more scanners connected to the PC 40. Three or more scanners may be connected to the PC 40.

In this case, a combo box used to select a scanner is added to the user interface 1101. In the combo box, names of selectable scanners are enumerated. Note that the user interface 1101 shown in FIG. 11 is an example of a user interface when one flatbed scanner and four sheetfeed scanners are connected.

Figure 12:
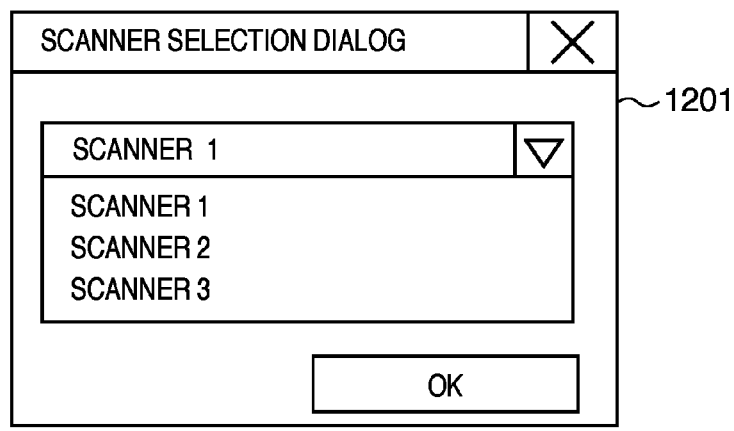
FIG. 12 is a view that describes an example of a scanner selection dialog.

FIG. 12 is a view that describes an example of a scanner selection dialog. A scanner selection dialog 1201 shown in FIG. 12 may be adopted in place of the aforementioned combo box. When the user selects a desired scanner from the scanner selection dialog 1201, a scanner driver corresponding to the selected scanner is loaded onto the RAM 42. The scanner driver need only be loaded onto the RAM 42 once, as described above.

When the user selects "auto" as the reading method, the CPU 46 may check the platens of all the sheetfeed scanners connected to the PC 40 via the scanner drivers, and may transmit a scan start command to only the sheetfeed scanner on which document sheets are placed.

FIG. 13 is a view that describes another example of the user interface. In the above embodiment, the flatbed driver 49b displays, on the user interface, only selection items of functions commonly supported by the flatbed scanner 10 and sheetfeed scanner 1.

As shown in FIG. 13, a user interface 1301 may display selection items which are not common to both the scanners. For example, assume that the flatbed scanner 10 supports a resolution=1200 dpi, but the sheetfeed scanner 1 does not support that resolution.

Furthermore, assume that the sheetfeed scanner 1 supports the blank detection function, and the flatbed scanner 10 also supports this function. In this case, when the user selects "feeder" as the reading method, the CPU 46 switches a display mode of the selection item "1200 dpi" of the resolution to a gray-out display mode, thereby invalidating selection of the resolution=1200 dpi.

In this manner, the CPU 46 serves as a unit which displays a setting item of a function, which is not extracted, on the display device 45 so as not to be operable on the user interface. On the other hand, when the user selects "flatbed", the CPU 46 switches the display mode of the selection item "1200 dpi" of the resolution from the gray-out display mode to a valid display mode.

Hence, the CPU 46 serves as a determination unit which determines an image reading apparatus selected via the user interface, and a change unit which changes operable items on the user interface according to the functions included in the image reading apparatus selected via the user interface.

As described above, when the user presses the special function button 56, the CPU 46 displays the setting dialog 57 shown in FIG. 9. The setting dialog 57 is displayed on the display device 45 by the flatbed driver 49b which calls the setting dialog of the sheetfeed driver 49a.

Hence, the CPU 46 displays the special function button 56 to be selectable when the user sets "feeder" as the reading method. Otherwise, the CPU 46 switches the display mode of the special function button 56 to the gray-out display mode so as to invalidate selection of the special function button 56.

This embodiment has been described under the assumption that the sheetfeed scanner 1 is connected to the flatbed scanner 10, and the flatbed driver 49b controls the sheetfeed driver 49a. However, the flatbed scanner 10 may be connected to the sheetfeed scanner 1, and the sheetfeed driver 49a may control the flatbed driver 49b. Also, a combination of the scanners is not limited to that of the flatbed scanner 10 and sheetfeed scanner 1. That is, the invention according to this embodiment can also be applied when a plurality of image reading apparatuses of different types are connected to the PC 40.

Figure 14A:
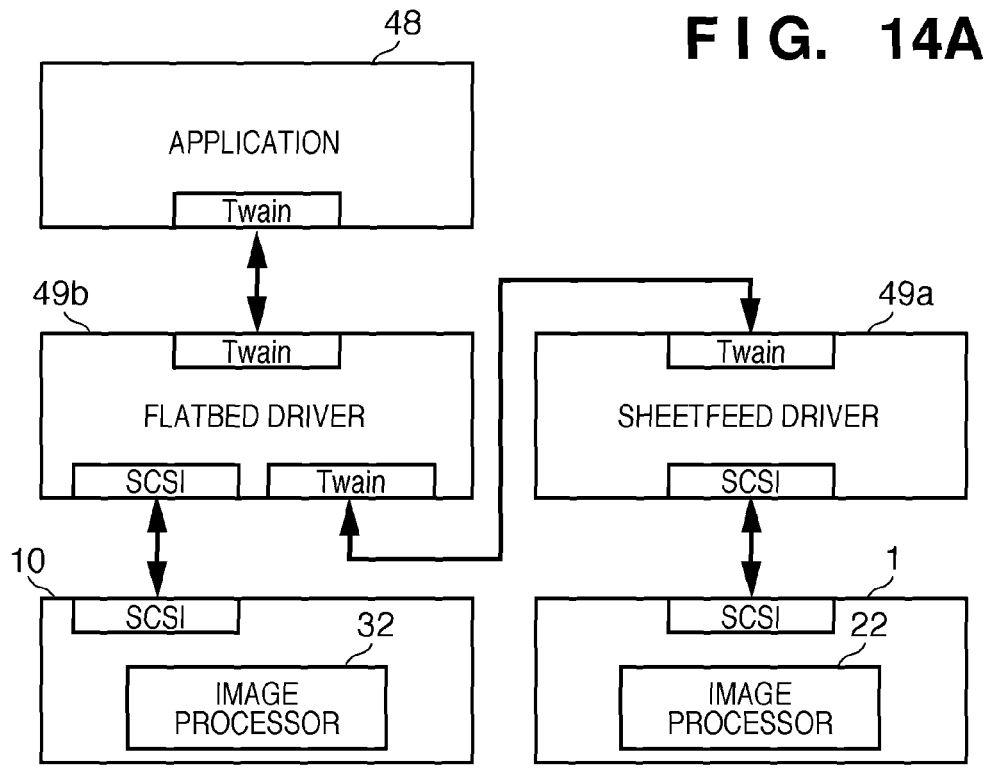
FIGS. 14A and 14B are diagrams for explaining installed locations of image processors.
Figure 14B:
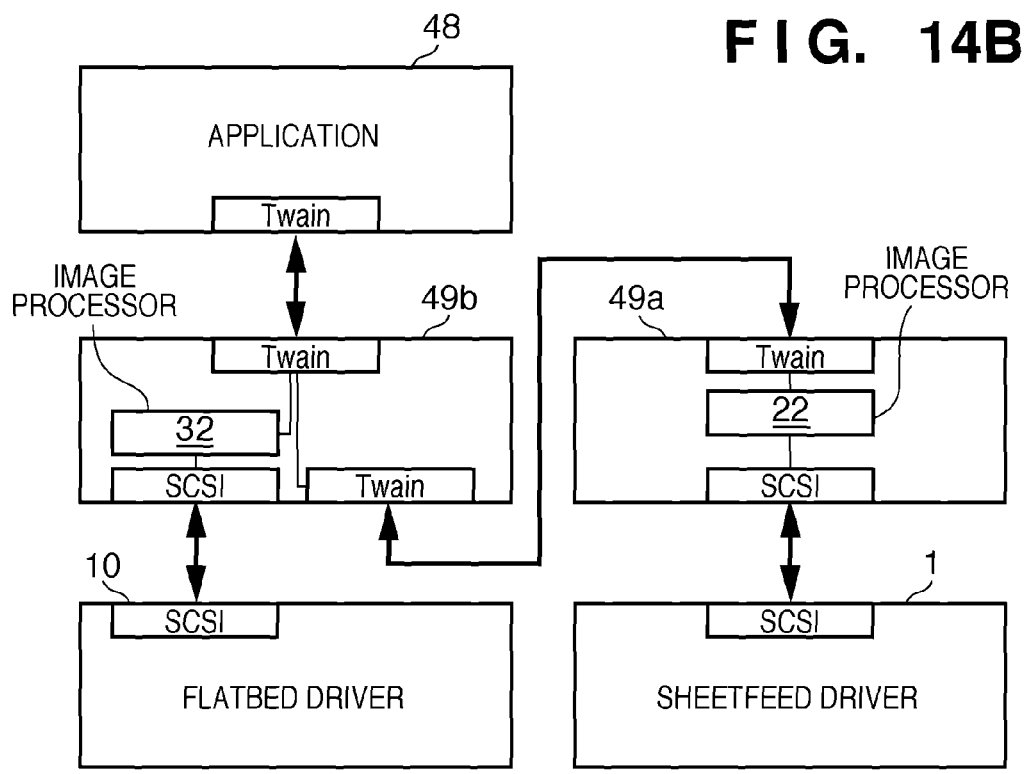

FIGS. 14A and 14B are diagrams for explaining installed locations of the image processors. In this embodiment, as shown in FIG. 14A, the flatbed scanner 10 and sheetfeed scanner 1 respectively include the image processors, which are not commonly used. However, as shown in FIG. 14B, the flatbed driver 49b and sheetfeed driver 49a may respectively include image processors.

As described above, according to this embodiment, the flatbed scanner 10 includes a plurality of connection units, the flatbed scanner 10 is connected to the PC 40, and the sheetfeed scanner 1 is connected to the flatbed scanner 10. Hence, the sheetfeed scanner 1 need not be modified to additionally use the flatbed scanner 10. Also, the user can connect the flatbed scanner 10 to the existing sheetfeed scanner 1, and can use these sheetfeed scanner 1 and flatbed scanner 10 independently or as one image reading unit.

According to this embodiment, since the first driver can control the first image reading apparatus, and the second driver can control the second image reading apparatus via the first driver, the need for a time required to unload or re-load the first driver can be obviated. Hence, a switching time required to switch the drivers can be shortened.

For example, when the application program 48 is activated when a plurality of image reading apparatuses having different reading schemes are connected to the PC (information processing apparatus), the application program 48 loads the first driver onto the memory of the information processing apparatus. Furthermore, the first driver loads the second driver onto the memory of the information processing apparatus. Hence, even when the user switches the scanner to be used on, for example, the user interface 53, none of unload, load, and initialization processes of the driver occur. That is, a switching time required to switch the scanner drivers can be shortened compared to the conventional system.

Since the first driver is configured so that the application program receives image data read by the second image reading apparatus via the first and second drivers, the present invention can be applied without changing the second driver for the second image reading apparatus.

That is, the second driver need not be updated or upgraded. Also, the first driver is configured to load the second driver onto the memory if the second driver is installed, and not to load the second driver if the second driver is not installed. That is, the first driver executes the load processing of the second driver in place of the application program.

Since the user switches the image reading apparatuses on the user interface provided by the flatbed driver 49b as the first driver, none of the unload, load, and initialization processes of the drivers are required upon switching of the image reading apparatuses. Note that when the second image reading apparatus is selected, the first driver behaves like an application program to pass a command to the second driver. Therefore, the second driver does not require any special updating or modification process upon application of the present invention.

The user interface of the flatbed driver 49b as the first driver provides setting items of functions common to the first and second image reading apparatuses. Hence, when any of these image reading apparatuses is selected, the operator can be prevented from making a setting that cannot be reflected to the reading processing.

Note that setting items which are not common may be cleared from the user interface or may be grayed out so such items are not operable. The grayed-out setting items can suggest the operator that these items can be set for another image reading apparatus which is not selected by the operator.

Also, operable setting items on the user interface may be changed according to functions included in the image reading apparatus selected via the user interface. In this case, not only setting items common to the plurality of image reading apparatuses but also all setting items that can be set for the selected image reading apparatus can be displayed. Hence, the operator can use all functions included in the selected image reading apparatus.

Furthermore, since the driver of the flatbed scanner, which can communicate with that of the sheet-through scanner, is used, for example, a reading instruction signal from the information processing apparatus (PC) can be transmitted to the sheet-through scanner. Conversely, the information processing apparatus can acquire a read image by the sheet-through scanner from the driver of the sheet-through scanner via the driver of the flatbed scanner. Then, the flatbed scanner can be connected between the information processing apparatus and the existing sheet-through scanner. That is, since the flatbed scanner only includes a plurality of connection units, the flatbed scanner can be connected to the information processing apparatus, and the existing sheet-through scanner can be connected to the flatbed scanner.

As a result, by only introducing the flatbed scanner, the user can easily selectively use the flatbed scanner and sheet-through scanner as one scanner unit based on an operation of the information processing apparatus. Also, the user who possesses the sheet-through scanner can additionally use the flatbed scanner without improving (modifying) the existing sheet-through scanner.

Note that the aforementioned embodiment has explained the image reading apparatuses of different types. However, the image reading apparatuses of different types are not limited to those having different reading schemes, but they may include, for example, image reading apparatus having nearly the same reading schemes, apparatuses having different document sizes to be read (for example, a model which supports an A4 size or less, and that which supports an A3 size or less), apparatuses having different specifications (performances), or apparatuses of different models. That is, the image reading apparatuses of different types are not limited to those of the aforementioned embodiment.

<Second Embodiment>

In the aforementioned scanner system described in Japanese Patent Laid-Open No. 2003-234864, a sheetfeed scanner requires an interface dedicated to a platen scanner. That is, when the sheetfeed scanner does not have any interface for the platen scanner, the platen scanner cannot be used.

A flatbed scanner described in Japanese Patent Laid-Open No. 2003-234864 is configured not to function unless a sheetfeed scanner is connected. That is, the flatbed scanner completely depends on the sheetfeed scanner (paragraph 0031), and cannot be used when it is solely connected to the PC.

Therefore, in order to additionally connect the flatbed scanner to the existing sheetfeed scanner, the existing sheetfeed scanner is required to be modified, thus disturbing, for the user, additional use of the flatbed scanner with respect to the existing sheetfeed scanner.

Note that the aforementioned problem may be similarly posed when the information processing apparatus uses a plurality of information reading apparatuses.

Hence, this embodiment provides, in consideration of the aforementioned situation, an information reading apparatus and image reading apparatus, which allow to connect another information reading apparatus to an existing information reading apparatus without modifying the existing information reading apparatus, and allow to use respective information reading apparatuses independently or one information reading unit. Note that such information reading apparatus and image reading apparatus have already been described in the first embodiment, and the second embodiment will explain another modification.

This embodiment is the same as the first embodiment described above, except that a flatbed scanner is adopted as a first image reading apparatus, a sheetfeed scanner is adopted as a second image reading apparatus, and when a sheet is set on either of these scanners, an image reading mode for the scanner which detected the sheet is selected.

More specifically, in this embodiment, the flatbed scanner includes a platen (first platen) used to set a sheet, and the platen includes a sheet detection sensor (first sheet detection unit), thus allowing to detect the presence/absence of a sheet. On the other hand, the sheetfeed scanner similarly includes a platen (second platen) used to set a sheet, and the platen includes a sheet detection sensor (second sheet detection unit), thus allowing to detect the presence/absence of a sheet.

Since such structure is adopted, it can be detected that a sheet is set on one of the flatbed scanner and sheetfeed scanner. Information associated with the presence/absence of a sheet can be transmitted to an application via respective drivers.

For example, in a state in which the flatbed scanner is connected to the information processing apparatus (PC), and the sheetfeed scanner is connected to that flatbed scanner, information associated with the presence/absence of a sheet on the sheetfeed scanner can be transmitted from the sheetfeed driver to the application via the flatbed driver. Note that information associated with the presence/absence of a sheet on the flatbed scanner can be directly transmitted from the flatbed driver to the application.

In this way, when a sheet is detected on one of the flatbed scanner and sheetfeed scanner, since the scanner which detected the sheet is set in a readable state, an image reading mode for that scanner can be selected.

Then, for example, based on an operation from the information processing apparatus (an operation from a user interface screen upon execution of the application in practice), the scanner which detected the sheet can start image reading processing.

In this embodiment, although not shown, a control panel or operation button (for example, a scan start button) used to control a scan operation or to execute a setting operation can be provided to the sheetfeed scanner and flatbed scanner. In such case, in response to an operation on the scanner side while a sheet is set, the scanner which detected the sheet can be controlled to start image reading processing.

Furthermore, a read image can be automatically transmitted from the scanner to the information processing apparatus. In this case, for example, a read image of the sheetfeed scanner is transmitted from the sheetfeed driver to the information processing apparatus via the flatbed driver.

With the above arrangement, another image reading apparatus can be connected to an existing image reading apparatus such as a sheetfeed scanner without modifying the existing image reading apparatus, and the respective image reading apparatuses can be used independently or as one image reading unit, thus further improving the user's convenience. Note that the arrangement described in this embodiment can be applied to the aforementioned first embodiment.

<Third Embodiment>

Figure 15:
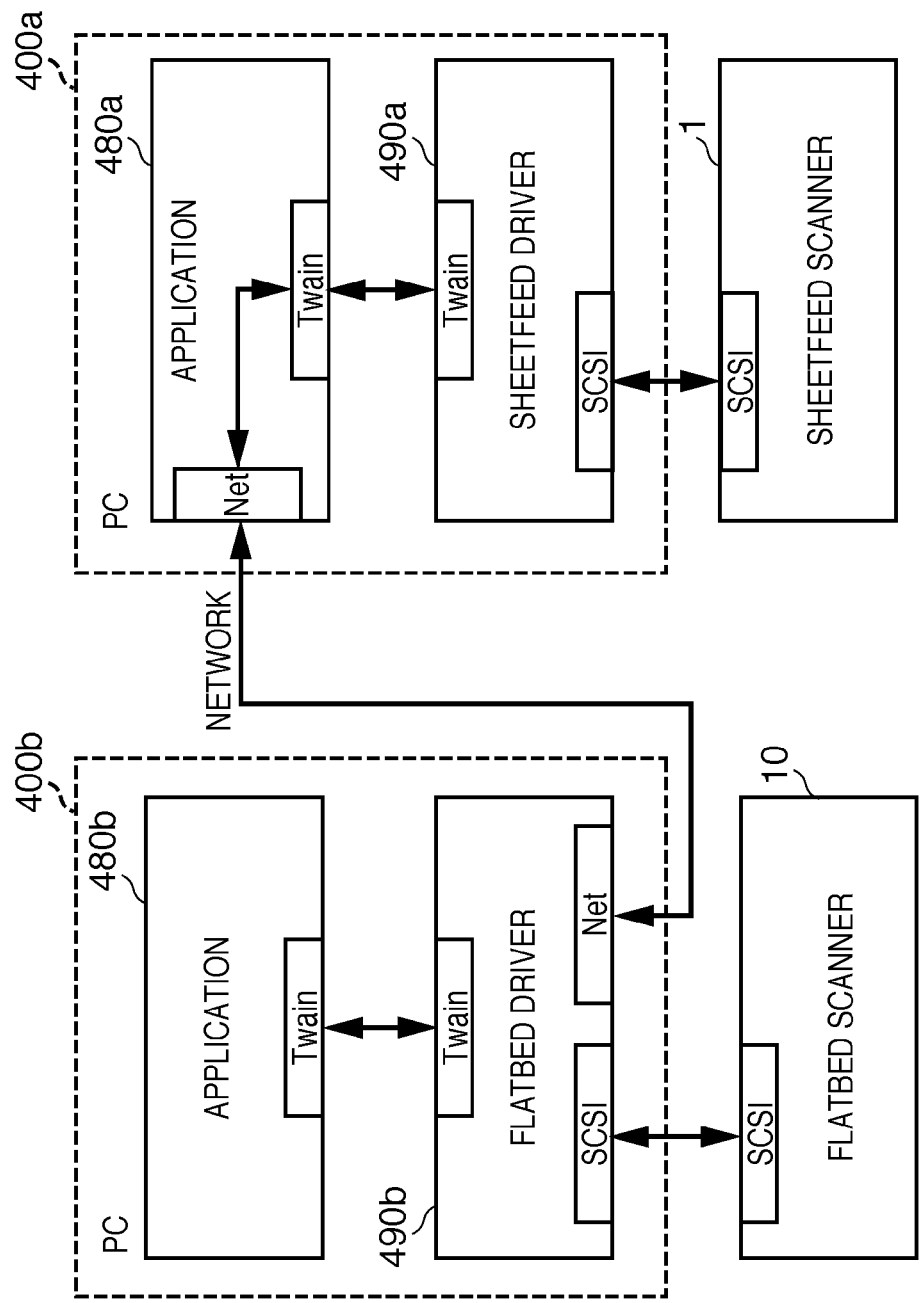
FIG. 15 is a schematic diagram that describes the arrangement of another image reading apparatus as an example of an information reading apparatus according to the third embodiment.

FIG. 15 is a schematic diagram of an image reading apparatus (image reading unit) as an example of an information reading apparatus according to the third embodiment of the present invention.

As shown in FIG. 15, an image reading apparatus of this embodiment includes a sheetfeed scanner 1 as an example of a second image reading apparatus connected to an information processing apparatus 400a such as a PC, and a flatbed scanner 10 as an example of a first image reading apparatus connected to another information processing apparatus 400b.

More specifically, the two information processing apparatuses 400a and 400b are connected via a network to be able to communicate with each other.

In the information processing apparatus 400a, as control programs used to control the sheetfeed scanner 1, an application 480a and sheetfeed driver (second driver) 490a are installed.

That is, the information processing apparatus 400a can acquire, via the sheetfeed driver 490a, images which are read by the sheetfeed scanner 1 based on various kinds of instruction information sent from the application 480a to the sheetfeed scanner 1 via the sheetfeed driver 490a.

On the other hand, in the information processing apparatus 400b, as control programs used to individually control the flatbed scanner 10 or sheetfeed scanner 1, an application 480b and flatbed driver 490b are installed.

The flatbed driver 490b in this case is a multi-function driver, and can directly output various kinds of instruction information from the application 480b to the application 480a of the information processing apparatus 400a via the network in addition to the flatbed scanner 10.

More specifically, the application 480a for the sheetfeed scanner 1 has a function of receiving instruction information of the information processing apparatus 400b (application 480b) from the flatbed driver 490b via the network, and transmitting that information to the sheetfeed driver 490a using a Twain protocol. That is, the flatbed driver 490b for the flatbed scanner 10 can exchange information with the application 480a for the sheetfeed scanner 1 in addition to the application 480b for the flatbed scanner 10.

In this way, the information processing apparatus 400b can control both the flatbed scanner 10 and sheetfeed scanner 1 based on various kinds of instruction information from the application 480b. For this reason, the information processing apparatus 400b can acquire a read image from the flatbed scanner 10, and can also acquire read images from the sheetfeed scanner 1.

As described above, since this embodiment adopts the aforementioned arrangement, another image reading apparatus (for example, the flatbed scanner 10) can be connected to an existing image reading apparatus (for example, the sheetfeed scanner 1) via the network without modifying the existing image reading apparatus (the sheetfeed scanner 1) to add a component such as a connection unit. In this way, the user can use the respective image reading apparatuses independently or as one image reading unit as needed, and a use mode of apparatuses having very high degrees of freedom for the user can be implemented and provided.

Note that the execution sequence of, for example, the load processing of the sheetfeed driver 490a and flatbed driver 490b can be the same as that in the aforementioned first embodiment.

This embodiment has explained the case in which the flatbed driver 490b can communicate with the application 480a for the sheetfeed scanner 1 via the network. Of course, the present invention is not limited to this. For example, as shown in FIG. 16, the flatbed driver 490b may communicate with the application 480a for the sheetfeed scanner 1 via the application 480b for the flatbed scanner 10. In any case, the present invention allows to connect another information reading apparatus to an existing information reading apparatus such as the sheetfeed scanner 1 without modifying the existing information reading apparatus (for example, a hardware modification to add a connection unit or the like) by only adding a function required to issue instructions to a driver of the existing information reading apparatus to a driver of the other information reading apparatus which is connected to the existing information reading apparatus to be able to communicate with each other.

<Fourth Embodiment>

The aforementioned first or second embodiment has exemplified an image reading apparatus including a sheetfeed scanner having a nearly horizontal sheet convey path. Of course, the present invention is not limited to this, and can be applied to information reading apparatuses such as various sheetfeed scanners. FIGS. 17A to 20 are schematic views that describes the arrangement of another image reading apparatus (sheetfeed scanner) as an example of an information reading apparatus according to the fourth embodiment of the present invention.

Figure 17A:
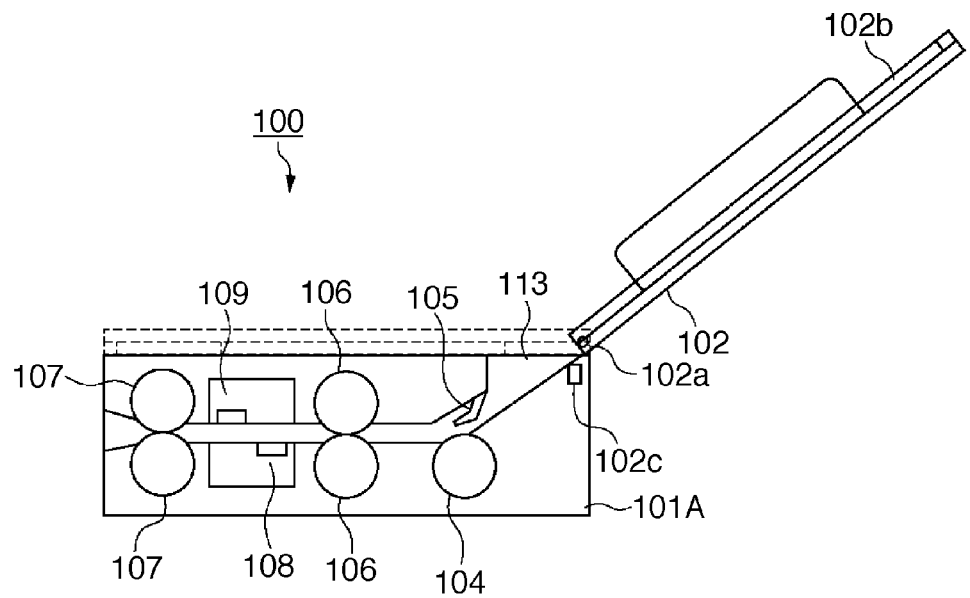
FIGS. 17A and 17B are schematic views that describes the arrangement of another image reading apparatus as an example of an information reading apparatus according to the fourth embodiment.
Figure 17B:
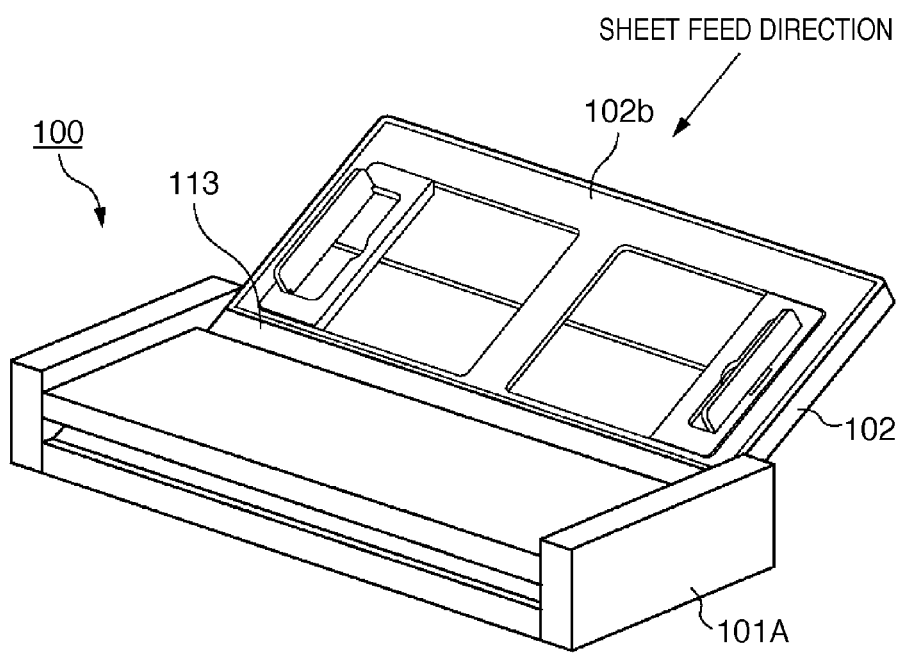

More specifically, in an image reading apparatus 100 shown in FIGS. 17A and 17B, a feed tray 102 which carries document sheets is supported by an apparatus main body 101A via hinges 102a to be openable/closable. The feed tray 102 covers a document feed port 13 in a closed state (the dotted line in FIG. 17A), and carries document sheets on a stacking surface 102b in an open state (the state shown in FIGS. 17A and 17B).

A plurality of document sheets carried on the feed tray 102 are separated and fed onto a convey path by a feed roller 104 and separation pad 105 one by one in turn from the lowermost document sheet. A document sheet fed onto the convey path is conveyed to the downstream side by a convey roller pair 106. Furthermore, images on the obverse and reverse faces of the document sheet are read by reading sensors 108 and 109, and the document sheet is then exhausted outside the apparatus by a convey roller pair 107. The present invention can also be applied to such image reading apparatus.

Figure 18:
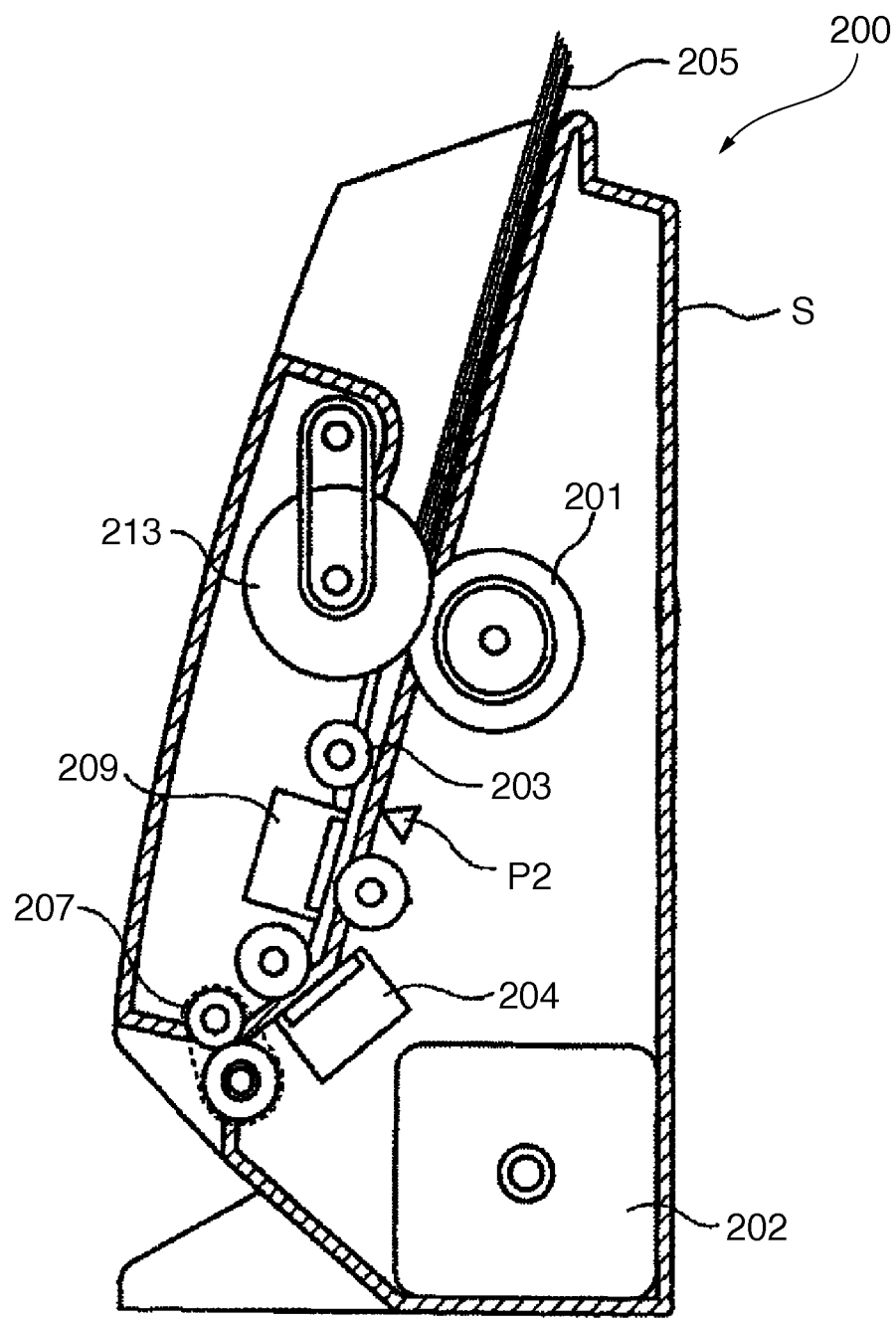
FIG. 18 is a schematic view that describes the arrangement of another image reading apparatus as an example of an information reading apparatus according to the fourth embodiment.

An image reading apparatus 200 shown in FIG. 18 is a scanner including an upright convey path, and the whole apparatus is configured by a scanner main body S. More specifically, the scanner main body S includes a feed roller 201, which is connected to a motor 202.

A convey roller 203 is arranged downstream of the feed roller 201. A first image reading sensor 204 which reads one face of a document sheet is arranged downstream of the convey roller 203.

An exhaust roller 207 is arranged on the downstream side of the first image reading sensor 204. A second image reading sensor 209 which reads the other face of a document sheet is arranged in front of the exhaust roller 207.

Note that a registration sensor P2 which detects arrival and passage of a document sheet is arranged at an intermediate position between the convey roller 203 and second image reading sensor 209.

In such upright image reading apparatus, the feed roller 201, convey roller 203, and exhaust roller 207 are simultaneously driven by the motor 202. Note that a separation roller 213 is arranged on the opposing side of the feed roller 201.

In this way, document sheets from a platen 205 are fed by the feed roller 201 while being separated one by one. The present invention can also be applied to such upright image reading apparatus.

An information reading apparatus 300 shown in FIG. 19 is a check scanner used to read paper sheets such as checks and bills of exchange, and includes a platen 302 used to set paper sheets, a convey path 303 used to convey upright paper sheets, and an exhaust portion 304 used to set exhausted paper sheets.

Although not shown, a magnetic sensor for reading MICR (Magnetic Ink Character Recognition) characters of paper sheets is arranged on the convey path 303. Note that a reading sensor for reading character information by OCR (Optical Character Recognition) or a reading sensor for reading images of paper sheets may be arranged on the convey path.

Paper sheets set on the platen 302 pass through the convey path 303 without being multiple-fed by a separation roller (not shown) and are exhausted, and the exhausted paper sheets are set on the exhaust portion 304. The present invention can also be applied to the information reading apparatus as such check scanner.

An image reading apparatus 400 shown in FIG. 20 is a U-turn path type sheetfeed scanner, and includes a feed tray 402 which is arranged on one end side of an apparatus main body 401 and is used to feed a document sheet S, a U-turn shaped convey path 403, and an exhaust tray 404 used to receive the exhausted document sheet S.

Along the convey path 403, a pickup roller 405, feed roller pair 406, convey roller pair 407, image reading unit 408 used to read an image on the document sheet S, and exhaust roller pair 409 are arranged in turn from the feed tray 402 side.

Thus, the document sheet S is taken from the feed tray 402 into the apparatus main body 401, and an image or images on one or both faces is or are read by the image reading unit 408 while the document sheet S is conveyed along the convey path 403. The present invention can also be applied to the image reading apparatus 400 as such U-turn path type sheetfeed scanner.

As described above, this embodiment has exemplified various sheetfeed scanners. By applying these information reading apparatuses such as scanners to the present invention, the same effects as in the aforementioned first or second embodiment can be obtained.

<Fifth Embodiment>

In the scanner system described in Japanese Patent Laid-Open No. 2003-234864, various functions are concentrated on a sheetfeed scanner, and a flatbed scanner cannot be additionally used unless that sheetfeed scanner is introduced, resulting in very poor usability. In order to connect a flatbed scanner to an existing sheetfeed scanner, the existing sheetfeed scanner has to be modified, thus disturbing additional use of the flatbed scanner with respect to the existing sheetfeed scanner.

Note that the aforementioned problem may be similarly posed when the information processing apparatus uses a plurality of information reading apparatuses.

Hence, this embodiment provides an information reading apparatus, image reading apparatus, information reading system, and information reading processing program, which allow to connect a plurality of information reading apparatuses and to use the respective information reading apparatuses independently or as one information reading unit, and can assure high user's convenience.

For example, an image reading apparatus (an example of an information reading apparatus) including a sheetfeed scanner 1 and flatbed scanner 10 according to this embodiment can be applied to a case in which one image file (combined information) is formed by combining the respective scanners 1 and 10. Then, an image reading apparatus with high user's convenience can be implemented.

More specifically, in the image reading apparatus of this embodiment, after an application program is activated, first and second drivers are automatically activated. In this way, since the two drivers are set in an active state, a time required until a standby state is set can be shortened.

A PC 40 as an example of an information processing apparatus is, for example, installed with a control program which includes the first driver (flatbed driver 49b) required to control the flatbed scanner 10, the second driver (sheetfeed driver 49a) required to control the sheetfeed scanner 1, and an application program which receives image information from the respective drivers. The control program includes a program which combines read images by the scanners 1 and 10 in a state in which the sheetfeed scanner 1 and flatbed scanner 10 are connected to the PC and are ready to use after their drivers are activated.

In this embodiment, this read image combining program is executed while being embedded in the application program. Upon combining a plurality of read images, the application program may allow to change the combining order of read images as needed, or may automatically execute combining processing in an order of reading. Furthermore, not only images read by the respective scanners 1 and 10 are simply combined, but also one image file may be formed by inserting a read image of one scanner into those of the other scanner. More specifically, a function of setting, in advance, an insertion position of an image scanned by the flatbed scanner 10 in a batch scanned by the sheetfeed scanner 1 (insert a program such as an insertion position setting mode into the control program) is provided, and images read by the scanners 1 and 10 may be combined by insertion. In this case, images as a batch are read by the sheetfeed scanner 1, and an image read by the flatbed scanner 10 later is inserted in the middle of the batch based on the insertion setting. In this manner, one combined image file having the precise order in the batch can be obtained.

When the sheetfeed scanner 1 reads a plurality of document sheets including a document sheet which is difficult or impossible to be conveyed, information of that document position may be stored as an insertion combining position, or may be replaced by a barcode or mark sheet. Then, that document sheet may be read by the flatbed scanner 10 and may be inserted at the insertion combining position (middle of a batch) later. Then, when a convey error (for example, a jam) has occurred in the sheetfeed scanner 1, an image scanned by the flatbed scanner 10 is inserted at the jam position, thus acquiring one image file.

In this manner, in this embodiment, the scanner drivers (the flatbed driver 49b and sheetfeed driver 49a) of the scanners 1 and 10 are activated together with the application program without being switched every time the scanners are switched, thus setting both the scanners 1 and 10 in a usable state.

Therefore, for example, when the user wants to read a front or back cover, and a plurality of document sheets laid out between the front and back covers as one file, the application program issues instructions to the scanners so that the flatbed scanner 10 reads the front or back cover, and the sheetfeed scanner 1 reads the plurality of document sheets. Then, the read images of these scanners can be acquired as one file after the combining processing.

A case will be described below using FIG. 21 wherein the sheetfeed scanner 1 reads a plurality of document sheets, the flatbed scanner 10 reads one document sheet used as, for example, a front cover, and the read images are combined as the processing sequence of the above continuous operations.

Figure 21:
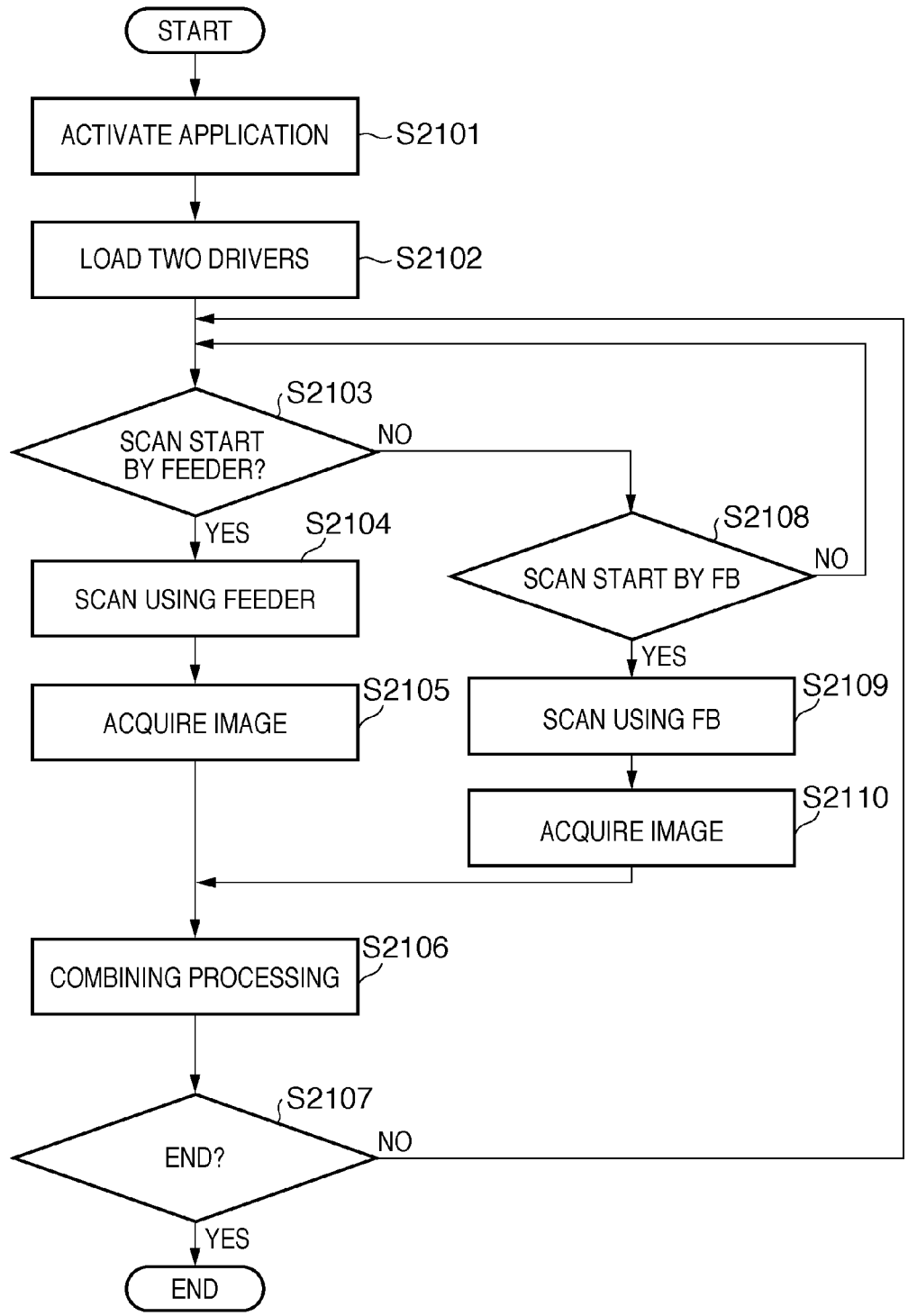
FIG. 21 is a flowchart that describes an image reading sequence.

FIG. 21 is a flowchart that describes the operation of the image reading apparatus (system) according to this embodiment.

As shown in FIG. 21, after the application program is executed (step S2101), the sheetfeed driver 49a and flatbed driver 49b stored in an HDD are loaded onto a memory such as a RAM (step S2102). The processes in steps S2101 and S2102 can be executed in the same manner as those in steps described using FIG. 7. Note that the load timings of the drivers 49a and 49b may be synchronized with the activation timing of the application program, or these drivers may be activated by a user operation independently of the application program. In any case, both the drivers 49a and 49b are activated.

The control prompts the user to select whether or not to start a scan using the sheetfeed scanner 1 (step S2103). If the user designates a scan using the sheetfeed scanner 1 in step S2103 (YES), the sheetfeed scanner 1 is controlled to execute scan processing (step S2104), and the application program acquires images read by the sheetfeed scanner 1 (S2105). Assume that a plurality of document sheets are set on the sheetfeed scanner 1 in this case. In FIG. 21, a scanner reading setting step is not shown, but it may be executed at a desired timing. After that, the combining processing of the plurality of images read by the sheetfeed scanner 1 is executed (step S2106), and the control prompts the user to select whether or not to end the scan, that is, to execute continuous scan operations (step S2107).

If the user starts continuous scan operations (NO), the process returns to step S2103. If the user does not designate any scan using the sheetfeed scanner 1 in step S2103 (NO), the control prompts the user to select whether or not to start a scan using the flatbed scanner 10 (step S2108). If the user designates a scan using the flatbed scanner 10 in step S2108 (YES), the flatbed scanner 10 is controlled to execute scan processing (S2109), and the application program acquires an image read by the flatbed scanner (step S2110). Note that in the flowchart shown in FIG. 21, the user can designate continuous operations of the sheetfeed scanner 1 or flatbed scanner 10, or can use both the scanners 1 and 10 in combination as needed.

Next, the read images acquired from the sheetfeed scanner 1 in previous step S2105 and the read image acquired from the flatbed scanner 10 in step S2110 are combined (step S2106). After that, the process advances to step S2107, and if there is no document which is to undergo continuous scan operations (step S2107: YES), the scan processing ends.

Note that in step S2106, in addition to the combining processing of a plurality of images read by the sheetfeed scanner 1, an image read by the flatbed scanner 10 can be combined with those of the sheetfeed scanner 1, or a plurality of document sheets can be individually combined with each image read by the flatbed scanner 10.

The flowchart shown in FIG. 21 has explained an example of the sequence in which document sheets are read by the sheetfeed scanner 1, a document sheet is then read by the flatbed scanner 10, and read images are combined. Of course, the present invention is not limited to this.

For example, steps S2103 and S2108 may be replaced. That is, the control may prompt the user to select whether or not to start a scan using the flatbed scanner 10, and the flatbed scanner 10 may start the scan processing. After that, upon execution of continuous scan operations, images may be read by the sheetfeed scanner without selecting the flatbed scanner 10, and read images of both the scanners may then be combined. In any case, the user can appropriately set the reading order of the sheetfeed scanner 1 and flatbed scanner 10 in steps S2103 and S2108.

Figure 22:
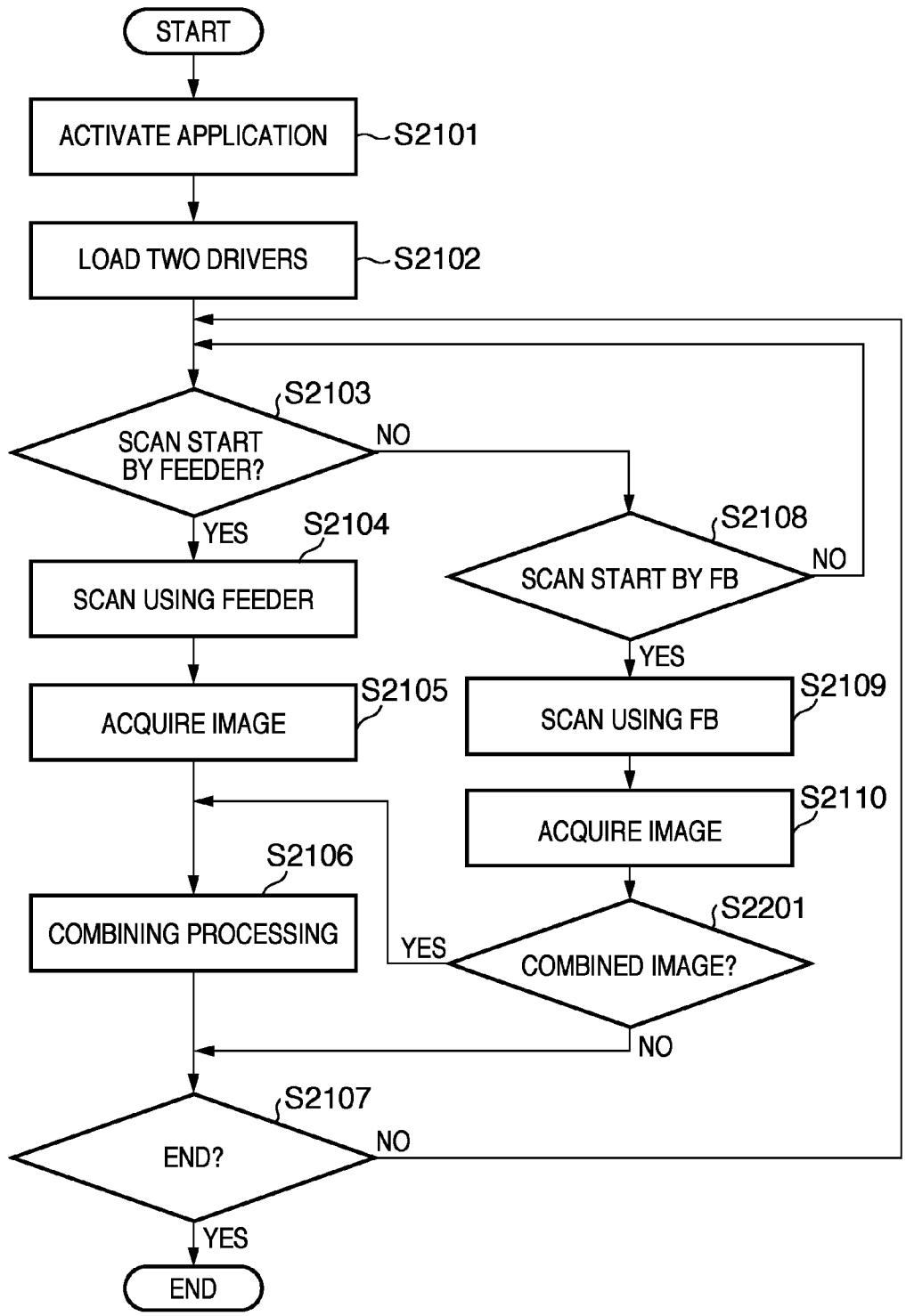
FIG. 22 is a flowchart that describes another image reading sequence.

Also, as shown in FIG. 22, after step S2110, the control may prompt the user to select the presence/absence of a combined image (step S2201). With this sequence, when the user wants to read an image of one document sheet using the flatbed scanner 10 and then to read a plurality of document images using the sheetfeed scanner 1, he or she selects the flatbed scanner 10 in step S2108 without selecting the sheetfeed scanner 1 in step S2103, and selects the absence of a combined image in step S2201, so as to select continuous scan operations (step S2107: NO). Then, the user selects the sheetfeed scanner 1 in step S2103 to combine images read by the sheetfeed scanner 1 with that read by the flatbed scanner 10 in the previous process in step S2106.

In FIG. 21 or 22, in place of step S2201, a step of determining whether or not read images to be combined are available may be inserted before step S2106.

In FIG. 21 or 22, the user selects continuous scan operations in step S2107. Of course, the present invention is not limited to this. For example, the user may be allowed to select, in advance, whether or not to execute continuous operations, as shown in FIG. 23.

Figure 23:
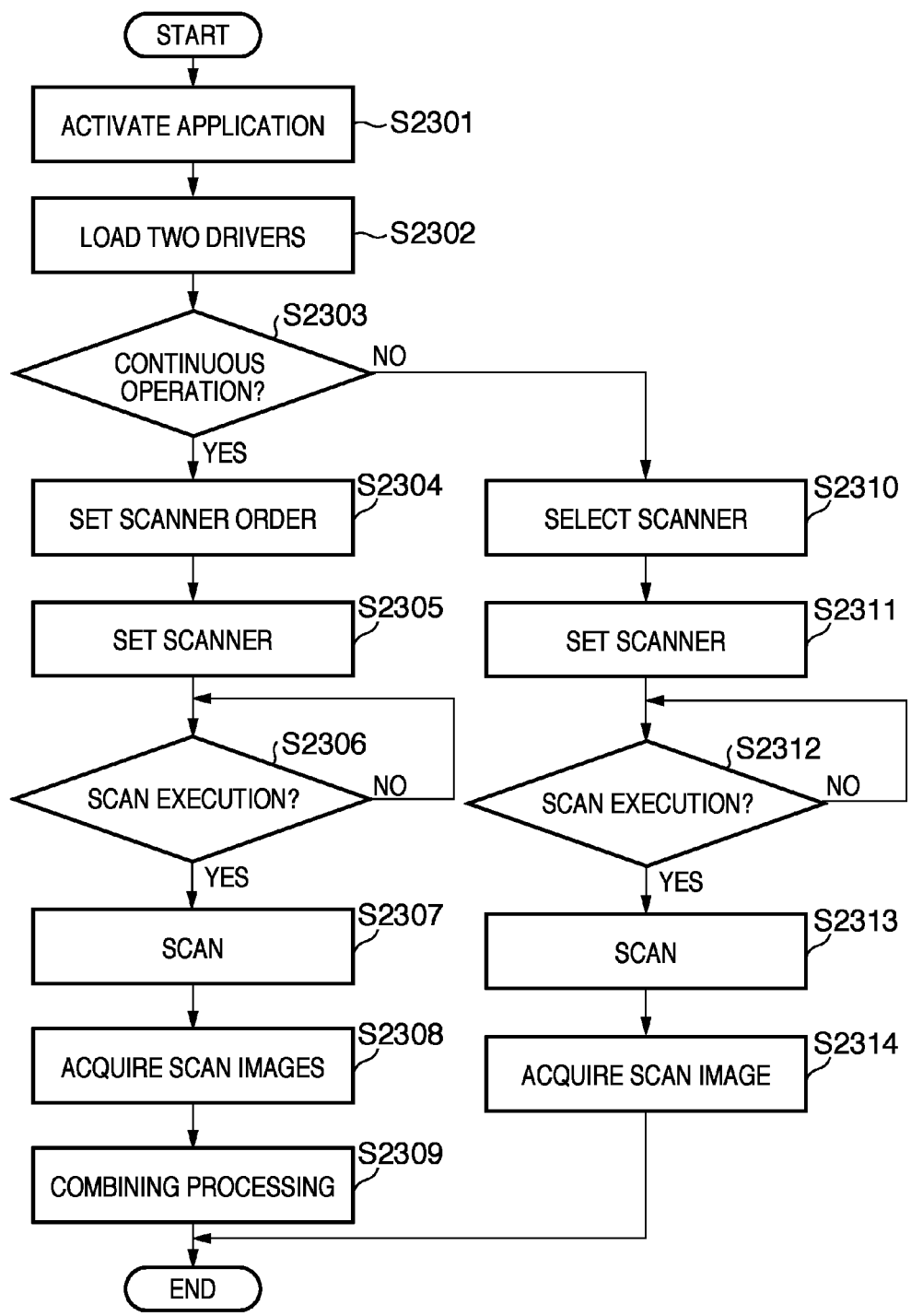
FIG. 23 is a flowchart that describes still another image reading sequence.

More specifically, as shown in FIG. 23, after the application program is executed (step S2301), the sheetfeed driver 49a and flatbed driver 49b stored in the HDD are loaded onto a memory such as a RAM (step S2302). In this case, the processes in steps S2301 and S2302 can be executed in the same manner as those in steps described in, for example, FIGS. 7 and 21.

Next, the user switches a mode as to whether or not to execute continuous scan operations using the two scanners 1 and 10 (step S2303). If the user designates the continuous scan operations in step S2303 (YES), he or she sets a scanner order (step S2304). Then, the user makes scan settings in the respective scanners 1 and 10 (step S2305). The scan settings in this step correspond to scanner reading settings including, for example, a document size, resolution, color or monochrome reading scheme, and double- or single-sided reading mode. Of course, the present invention is not limited to these setting items.

Next, the control waits for a scan execution instruction based on an operation from the PC (step S2306). More specifically, the control waits whether or not the PC issues a scan execution instruction when the user presses a scan execution button on a reading control screen that is displayed upon, for example, activation of the application program. Upon reception of the scan execution instruction in step S2306 (YES), the scanners 1 and 10 are controlled to execute scan processing based on the predetermined scanner order and scan settings (step S2307).

Subsequently, the application program acquires respective images read in step S2307 (step S2308). Then, the application program executes combining processing of the acquired read images (step S2309). In this case, the application program may allow the user to appropriately change the order of read images to be combined, and may automatically execute the combining processing in the order of reading.

If the user designates not to execute continuous scan operations in step S2303 (NO), he or she selects one of the scanners 1 and 10 (step S2310). After the scanner settings (step S2311), the control waits for a scan execution instruction (step S2312). Upon reception of the scan execution instruction, the selected scanner is controlled to read an image (step S2313), and the application program acquires the image read by one of the scanners 1 and 10 (step S2314), thus ending the scan processing.

As described above, according to this embodiment, the plurality of scanners (sheetfeed scanner 1 and flatbed scanner 10) as examples of the information reading apparatuses are connected to the information processing apparatus such as the PC, both the scanner drivers are activated in a state in which the scanners 1 and 10 are used, and read images of the scanners 1 and 10 can be combined into one image file as needed. Thus, for example, a processing time required for continuous scan operations by the user can be shortened. The user can use the respective scanners 1 and 10 independently or as one scanner unit to acquire a desired image file. Thus, excellent user convenience can be realized.

In this embodiment, since the drivers of the scanners 1 and 10 are activated before reading processing of the respective scanners, a time required to switch the scanner drivers can be shortened.

Furthermore, in this embodiment, since the sheetfeed scanner 1 is connected to the flatbed scanner 10 connected to the PC, and information is exchanged between the PC and the scanners 1 and 10 via one driver (flatbed driver in the above embodiment), the flatbed scanner 10 can be added to the existing sheetfeed scanner (which does not have a plurality of connection units) 1 and can be used. In this manner, the user can use the scanners 1 and 10 independently or as one scanner unit, thus further improving the user's convenience.

<Other Embodiments>

The present invention has been described by way of the first to fifth embodiments. However, the present invention is not limited to the first to fifth embodiments. For example, in the first embodiment and the like, the information processing apparatus (PC 40) and second image reading apparatus (sheetfeed scanner 1) are connectable to the first image reading apparatus (flatbed scanner 10). Of course, the present invention is not limited to this. For example, the first image reading apparatus may further include connection units, and one or more peripheral devices including another image reading apparatus may be connected. When the second image reading apparatus includes a connection unit with the first image reading apparatus and also a connection unit for other devices, another image reading apparatus may be connected to the second image reading apparatus. In this case, these apparatus may be connected serially or parallelly. Note that such connections may be applied to the image reading apparatuses of the second embodiment and the like. In any case, the user can use a plurality of image reading apparatuses independently or as one image reading unit.

Note that the first embodiment and the like described above have explained the image reading apparatus (image reading unit) including the first and second image reading apparatuses. Of course, the present invention is not limited to this. For example, the information processing apparatus and image reading unit may form an image reading system or an information reading system which reads character information, graphic information, identification information, and the like other than images.

The feature of the present invention can be achieved when a storage medium which records a program code of software required to implement the functions of the aforementioned embodiments is supplied to a system or apparatus, and a computer (a CPU, MPU, etc.) of the system or apparatus reads out and executes the stored program code, as described above.

That is, an information processing apparatus includes a control program, which includes a first driver required to control a first information reading apparatus which is connected to the information processing apparatus and is used to read information on a sheet, a second driver required to control a second information reading apparatus which is connected to the first information reading apparatus and is used to read information on a sheet, and an application program which receives information from the first or second driver. Then, the control program controls the information processing apparatus to function to activate the first and second drivers upon activation of the application program, so as to set the first and second information reading apparatuses in a controllable state. The control program controls the information processing apparatus to function to execute combining processing of first information read by the first information reading apparatus and second information read by the second information reading apparatus in an active state of the first and second drivers. The feature of the present invention is achieved by using such program as an information reading processing program of the present invention.

In this case, the program code itself read out from the storage medium implements a novel function of the present invention, and the storage medium which stores that program code configures the present invention.

Therefore, the form of program is not particularly limited, and an object code, a program to be executed by an interpreter, script data to be supplied to an OS (Operating System), and the like may be used as long as they have the program function.

As the storage medium used to supply the program, for example, a flexible disk, hard disk, optical disk, magneto-optical disk, MO, CD-ROM, CD-R, and CD-RW may be used. Also, a magnetic tape, nonvolatile memory card, ROM, and DVD may be used.

In this case, the program code itself read out from the storage medium implements the functions of the aforementioned embodiments, and the storage medium which stores that program code configures the present invention.

As another program supply method, the computer program of the present invention can also be downloaded, using a browser on a client computer, from a homepage on the Internet or the image reading apparatus 101 to a recording medium such as a hard disk device. Alternatively, the computer program of the present invention can also be supplied by downloading a compressed file including an automatic installation function to a recording medium such as a hard disk device. Also, the computer program of the present invention can be supplied by dividing program codes which configure the program of the present invention into a plurality of files, and downloading the respective files from different homepages. That is, a WWW server and ftp server which make a plurality of operators download the program files required to implement the functional processing of the present invention on their computers are included in the claims of the present invention.

Also, a storage medium such as a CD-ROM which stores an encrypted program of the present invention may be delivered to each operator. In this case, the operator who has cleared a predetermined condition is allowed to download key information that decrypts the encrypted program from a homepage via the Internet. The operator then executes the encrypted program using that key information to install the program in a computer, thereby implementing the present invention.

The present invention is also implemented not only when a computer executes the readout program code but also when, for example, an OS running on the computer executes some or all of actual processes based on the instruction of that program code.

Furthermore, the present invention includes a method of writing the program code read out from the storage medium in a memory equipped on a function expansion board or unit which is inserted in or connected to a computer. In this case, the present invention is implemented when a CPU equipped on the function expansion board or unit executes some or all of actual processes based on the instruction of the program code.

The present invention may be applied to either a system including a plurality of devices or an apparatus including a single device. The present invention can also be applied to a case in which it can be achieved by supplying a program to the system or apparatus. In this case, by reading out, by the system or apparatus, a program which is stored in a storage medium and is expressed by software required to achieve the present invention, the system or apparatus can enjoy the effects of the present invention.

As described above, a first information reading apparatus has a plurality of connection units which can respectively connect an information processing apparatus and a second information reading apparatus. The first information reading apparatus may be a flatbed scanner which reads information on a sheet on a first platen by scanning a reading sensor along the first platen. The operation of the reading sensor may be controlled by the information processing apparatus. That is, the first information reading apparatus may include a first information reading unit which reads information on a sheet located within a reading region.

The second information reading apparatus may be an image scanner with an auto sheet feed function, which can read information on both faces of a sheet by a reading sensor arranged along a sheet convey path. More specifically, the second information reading apparatus may include a convey unit which conveys a sheet, and a second information reading unit which reads information of the conveyed sheet.

A reading instruction from the information processing apparatus to the first information reading apparatus may be directly transmitted to the first information reading apparatus.

Based on an operation by an operator for the first information reading apparatus and/or the second information reading apparatus, the operated information reading apparatus may execute a sheet information reading operation, and may transmit information read from the sheet to the information processing apparatus.

The first information reading apparatus and/or the second information reading apparatus may be allowed to connect one or more peripheral devices including another information reading apparatus.

A second driver may control the information processing apparatus to function as a unit which passes second read information from the second information reading apparatus to a first driver. The first driver may control the information processing apparatus to function as a unit which passes the second read information passed from the second driver to an application program.

The reading operations of the first and second information reading apparatuses may be controlled based on an operation by an operator at the information processing apparatus connected to the first information reading apparatus.

The information processing apparatus can connect a plurality of image reading apparatuses, and includes a first driver required to control a first image reading apparatus of the plurality of image reading apparatuses, a second driver required to control a second image reading apparatus different from the first image reading apparatus of the plurality of image reading apparatuses, and an application program required to exchange information with the first or second driver. The information processing apparatus may respectively activate the first and second drivers upon activation of the application program.

The information processing apparatus may connect the first information reading apparatus which reads information on a sheet, and the second information reading apparatus which reads information on a sheet may be connected to the first information reading apparatus. The information processing apparatus includes a control program. The control program includes a first driver required to control the first information reading apparatus, and a second driver required to control the second information reading apparatus. Furthermore, the control program includes an activation program and combining program. The activation program respectively activates the first and second drivers. The combining program may combine first read information generated from a sheet by the first information reading apparatus, and second read information generated from a sheet by the second information reading apparatus, when the second information reading apparatus is set in a connected state via the first information reading apparatus, and the first and second drivers are active.

An information reading processing program recorded in a recording medium includes a control program. The control program includes a first driver required to control a first information reading apparatus which is connected to the information processing apparatus and reads information on a sheet, and a second driver which is connected to the first information reading apparatus, and reads information on a sheet. Furthermore, the control program controls the information processing apparatus to function to respectively activate the first and second drivers and to set the first and second information reading apparatuses in a controllable state. Furthermore, the control program may control the information processing apparatus to execute combining processing of first read information generated by the first information reading apparatus and second read information generated by the second information reading apparatus in a state in which the first and second drivers are active in the information processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-190395 filed Aug. 19, 2009, No. 2009-200999 filed Aug. 31, 2009, and No. 2009-201002 filed Aug. 31, 2009, which are hereby incorporated by reference herein in their entirety.

What is claimed is:

1. An information reading system comprising:
a first information reading apparatus;
a second information reading apparatus; and
an information processing apparatus configured to connect to said first information reading apparatus and said second information reading apparatus in series or in parallel, said information processing apparatus comprising:
a first driver configured to control said first information reading apparatus;
a second driver configured to control said second information reading apparatus; and
an application program which receives image data from said first driver or said second driver, wherein said application program includes a first driver interface configured to communicate with said first driver and said second driver, wherein (i) said first driver includes a first driver application interface configured to communicate with said application program and (ii) said second driver includes a second driver application interface configured to communicate with said application program, and wherein said first driver includes a second driver interface configured to communicate with said second driver application interface, and wherein said information processing apparatus is configured to enter a state in which said information processing apparatus is available to use said first information reading apparatus and said second information reading apparatus by causing said first driver to activate said second driver after said first driver is activated by said application program, and wherein said information processing apparatus is further configured to (i) control said first information reading apparatus, via said first driver, when said first information reading apparatus reads an image and (i) control said second information reading apparatus via said first driver and said second driver when said second information reading apparatus reads an image.

2. The system according to claim 1, wherein said application program is configured to receive data of information read by said first information reading apparatus via said first driver, and data of information read by said second information reading apparatus via said first driver and said second driver.

3. The system according to claim 1,
wherein said application program is activated when both said first image reading apparatus and said second image reading apparatus are connected to said information processing apparatus, and
wherein said application program is further configured to load said first driver onto a memory of said information processing apparatus, and said first driver is configured to load said second driver onto the memory of said information processing apparatus.

4. The system according to claim 1, wherein said first driver controls said information processing apparatus to function as:
a determination unit which determines whether or not said second driver is installed in said information processing apparatus; and
a load unit which loads said second driver in said information processing apparatus when said second driver is installed in said information processing apparatus, and does not execute load processing of said second driver when said second driver is not installed in said information processing apparatus.

5. The system according to claim 1, wherein said first driver controls said information processing apparatus to function as:
a display unit which displays a user interface required to inquire an operator as to selection of one of said first information reading apparatus and said second information reading apparatus;
a first transmission unit which transmits a reading start command of information to said first information reading apparatus when said first information reading apparatus is selected via the user interface; and
a second transmission unit which transmits a reading start command of information to said second information reading apparatus when said second information reading apparatus is selected via the user interface.

6. The system according to claim 5, wherein said first driver controls said information processing apparatus to function as:
a unit which compares functions supported by said first information reading apparatus and functions supported by said second information reading apparatus, and extracts functions common to said first information reading apparatus and said second information reading apparatus, and
said display unit displays setting items of the extracted functions on the user interface.

7. The system according to claim 6, wherein said display unit displays setting items of the functions which are not extracted on the user interface so as not to be operable.

8. The system according to claim 5, wherein said first driver controls said information processing apparatus to function as:
a determination unit which determines the information reading apparatus selected via the user interface; and
a change unit which changes operable items on the user interface according to functions included in the information reading apparatus selected via the user interface.

9. The system according to claim 2,
wherein said second driver controls said information processing apparatus to function as a unit which passes data of information transferred from said second information reading apparatus to said first driver, and
wherein said first driver controls said information processing apparatus to function as a unit which passes the data of the information passed from said second driver to said application program.

10. The system according to claim 1,
wherein said first information reading apparatus reads information on a sheet located within a reading region, said second information reading apparatus reads information of a conveyed sheet, and
wherein said second information reading apparatus is connected to said first information reading apparatus connected to said information processing apparatus.

11. The system according to claim 1, wherein said first information reading apparatus and said second information reading apparatus control reading operations in said first information reading apparatus and said second information reading apparatus based on an operation on said information processing apparatus connected to said first information reading apparatus.

12. The system according to claim 1, wherein a reading instruction from said information processing apparatus to said second information reading apparatus is transmitted to said second information reading apparatus via said first information reading apparatus.

13. The system according to claim 1, wherein information read by said second information reading apparatus is transmitted to said information processing apparatus via said first information reading apparatus.

14. The system according to claim 11,
wherein said first information reading apparatus comprises:
a first platen used to set the sheet; and
a first sheet detection unit which is arranged in said first platen and detects the presence/absence of the sheet, and
wherein said second information reading apparatus comprises:
a second platen used to set a plurality of sheets; and
a second sheet detection unit which is arranged in said second platen, and detects the presence/absence of the sheets, and wherein when one of said first sheet detection unit and said second sheet detection unit detects a sheet, an information reading mode in said information reading system is switched to an information reading mode in which the information reading apparatus which detected the sheet reads information.

15. The system according to claim 14, wherein the information reading apparatus which detected the sheet executes an information reading operation of the sheet based on an operation on the information reading apparatus which detected the sheet, and transmits read information generated from the sheet to said information processing apparatus.

16. The system according to claim 1, wherein said application program comprises:
an activation program which activates said first driver; and
a combining program which combines first read information generated by reading a sheet by said first information reading apparatus and second read information generated by reading a sheet by said second information reading apparatus in a state in which said first driver and said second driver are activated.

17. The system according to claim 16, wherein said application program receives the first read information from said first driver, and receives the second read information from said second driver via said first driver.

18. The system according to claim 16, wherein said activation program activates said first driver after it is determined that said information processing apparatus is connected to said first information reading apparatus.

19. An information reading system comprising:
a plurality of information reading apparatuses of different types; and
an information processing apparatus configured to connect said plurality of information reading apparatuses in parallel or serially,
wherein said information processing apparatus comprises:
a first control unit which controls a first information reading apparatus of said plurality of information reading apparatuses;
a second control unit which controls a second information reading apparatus, whose type is different from said first information reading apparatus, of said plurality of information reading apparatuses; and
an image processing unit which receives image data from one of said first control unit and said second control unit, and executes image processing,
wherein said image processing unit comprises a first interface configured to to communicate with one of said first control unit and said second control unit,
wherein said first control unit comprises a second interface configured to communicate with said image processing unit, and a third interface configured to communicate with said second control unit, and
wherein said second control unit comprises a fourth interface configured to communicate with said image processing unit, and
wherein said first interface of said image processing unit is connected to said second interface of said first control unit, and said third interface of said first control unit is connected to said fourth interface of said second control unit, so that said image processing unit receives data of an image read by said first information reading apparatus via said first control unit, and receives data of an image read by said second information reading apparatus via said first control unit and said second control unit, and
wherein said information processing apparatus is configured to enter into a state in which said information processing apparatus is available to use said first information reading apparatus and said second information reading apparatus by causing said first control unit to activate said second control unit after said first control unit is activated by an application program, and
wherein said information processing apparatus is further configured to control said first information reading apparatus via said first control unit when said first information reading apparatus reads an image, and controls said second information reading apparatus via said first control unit and said second control unit when said second information reading apparatus reads an image.

20. A non-transitory computer readable storage medium storing a control program for controlling said information processing apparatus in the information processing system according to claim 1, wherein the control program provides said information processing apparatus with (i) said first driver configured to control said first information reading apparatus and (ii) said second driver configured to control said second information reading apparatus, and when executed the control program causes said information processing apparatus to transmit a control signal to said second information reading apparatus via said first driver and said second driver.

* * * * *